US012780965B2

(12) United States Patent
Kim et al.

(10) Patent No.: US 12,780,965 B2
(45) Date of Patent: Nov. 3, 2026

(54) PELLET-TYPE POLYETHYLENE RESIN COMPOSITION AND METHOD FOR PREPARING THE SAME

(71) Applicant: LG CHEM, LTD., Seoul (KR)

(72) Inventors: Changsub Kim, Daejeon (KR); Joongsoo Kim, Daejeon (KR); Yeonsoo Kim, Daejeon (KR); Bog Ki Hong, Daejeon (KR); Sol Cho, Daejeon (KR); Hyojoon Lee, Daejeon (KR); Jung Wook Wee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1183 days.

(21) Appl. No.: 17/784,085

(22) PCT Filed: Aug. 9, 2021

(86) PCT No.: PCT/KR2021/010485

§ 371 (c)(1),
(2) Date: Jun. 9, 2022

(87) PCT Pub. No.: WO2022/039425

PCT Pub. Date: Feb. 24, 2022

(65) Prior Publication Data

US 2023/0096686 A1 Mar. 30, 2023

(30) Foreign Application Priority Data

Aug. 19, 2020 (KR) ........................ 10-2020-0103997
Aug. 5, 2021 (KR) ........................ 10-2021-0103418

(51) Int. Cl.
*C08F 210/16* (2006.01)

(52) U.S. Cl.
CPC .................................. *C08F 210/16* (2013.01)

(58) Field of Classification Search
None
See application file for complete search history.

(56) References Cited

U.S. PATENT DOCUMENTS

| | | | |
|---|---|---|---|
| 2001/0000255 A1 | 4/2001 | Matsuoka et al. | |
| 2003/0036612 A1 | 2/2003 | Nifant'ev et al. | |
| 2006/0183631 A1 | 8/2006 | Lee et al. | |
| 2007/0135623 A1 | 6/2007 | Voskoboynikov et al. | |
| 2010/0121006 A1 | 5/2010 | Cho et al. | |
| 2011/0288249 A1 | 11/2011 | Voskoboynikov et al. | |
| 2015/0017365 A1 | 1/2015 | Sohn et al. | |
| 2016/0312017 A1 | 10/2016 | Hedesiu et al. | |
| 2017/0058063 A1 | 3/2017 | Lhost et al. | |
| 2018/0305481 A1 | 10/2018 | Yu et al. | |
| 2019/0127503 A1 | 5/2019 | Joung et al. | |
| 2019/0263942 A1 | 8/2019 | Jeong et al. | |
| 2019/0271417 A1 | 9/2019 | Tynys et al. | |
| 2020/0115475 A1 | 4/2020 | Im et al. | |
| 2020/0354492 A1 | 11/2020 | Ye et al. | |
| 2021/0009792 A1* | 1/2021 | Cottle | C08J 3/005 |
| 2021/0032449 A1 | 2/2021 | Park et al. | |
| 2022/0017667 A1 | 1/2022 | Kim et al. | |

FOREIGN PATENT DOCUMENTS

| | | | | |
|---|---|---|---|---|
| CN | 110337464 A | 10/2019 | | |
| CN | 110869399 A | 3/2020 | | |
| EP | 2894174 A1 | 7/2015 | | |
| EP | 3369752 A1 | 9/2018 | | |
| EP | 3872102 A1 | 9/2021 | | |
| JP | 2008-530298 A | 8/2008 | | |
| JP | 2020-505480 A | 2/2020 | | |
| KR | 10-2001-0108278 A | 12/2001 | | |
| KR | 10-2008-0097949 A | 11/2008 | | |
| KR | 10-2013-0111042 A | 10/2013 | | |
| KR | 10-1692346 B1 | 1/2017 | | |
| KR | 10-1725004 B1 | 4/2017 | | |
| KR | 10-2018-0075318 A | 7/2018 | | |
| KR | 10-2019-0074798 A | 6/2019 | | |
| KR | 10-2019-0074963 A | 6/2019 | | |
| KR | 10-2019-0079381 A | 7/2019 | | |
| KR | 10-2019-0104515 A | 9/2019 | | |
| KR | 10-2020-0050796 A | 5/2020 | | |
| KR | 10-2020-0077331 A | 6/2020 | | |
| KR | 10-2121298 B1 | 6/2020 | | |
| WO | 1997/20868 A1 | 6/1997 | | |
| WO | WO 2013/113797 A1 | * | 8/2013 | C08L 23/08 |
| WO | 2014-089671 A1 | 6/2014 | | |
| WO | 2015/162212 A1 | 10/2015 | | |
| WO | 2019/124835 A1 | 6/2019 | | |

OTHER PUBLICATIONS

Extended European Search Report issued Oct. 23, 2023 for corresponding European Patent Application No. 21858512.3.
Office Action issued Jun. 27, 2023 in corresponding Chinese Patent Application No. 202180007401.8.
International Search Report (with translation) and Written Opinion dated Nov. 30, 2021, issued in corresponding International Patent Application No. PCT/KR2021/010485.

* cited by examiner

*Primary Examiner* — Fred M Teskin
(74) *Attorney, Agent, or Firm* — Morgan, Lewis & Bockius LLP

(57) ABSTRACT

Provided are a pellet-type polyethylene resin composition capable of improving pipe pressure resistance property, dimensional stability, and processability at the same time, and a method of preparing the same.

14 Claims, 15 Drawing Sheets

【FIG. 1】
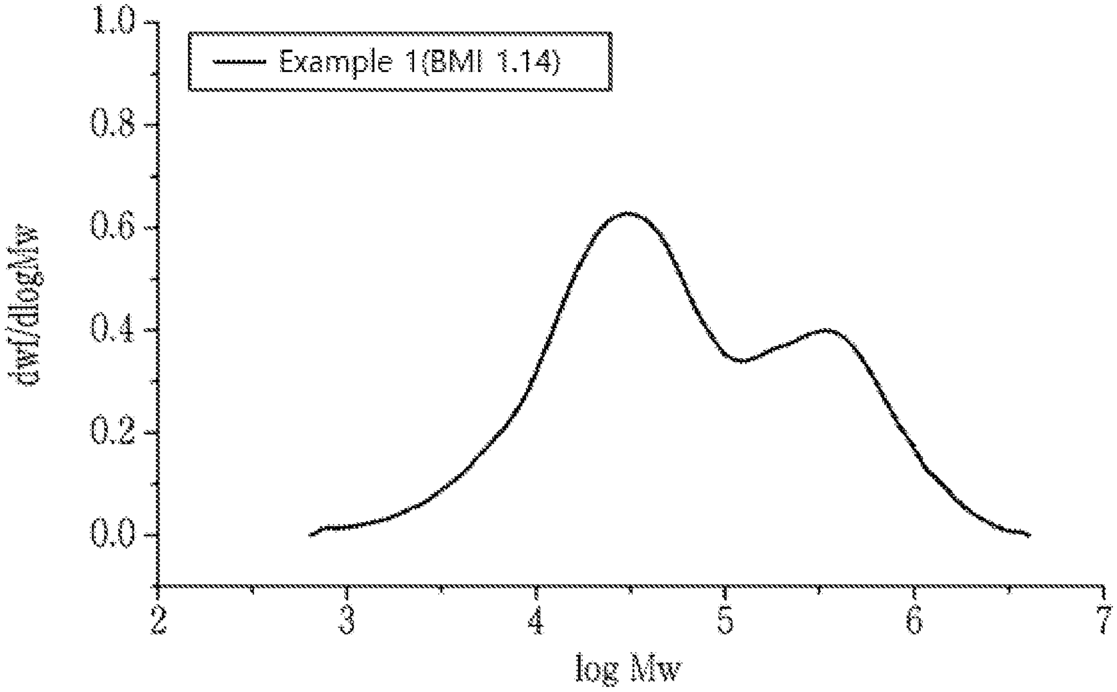

【FIG. 2】
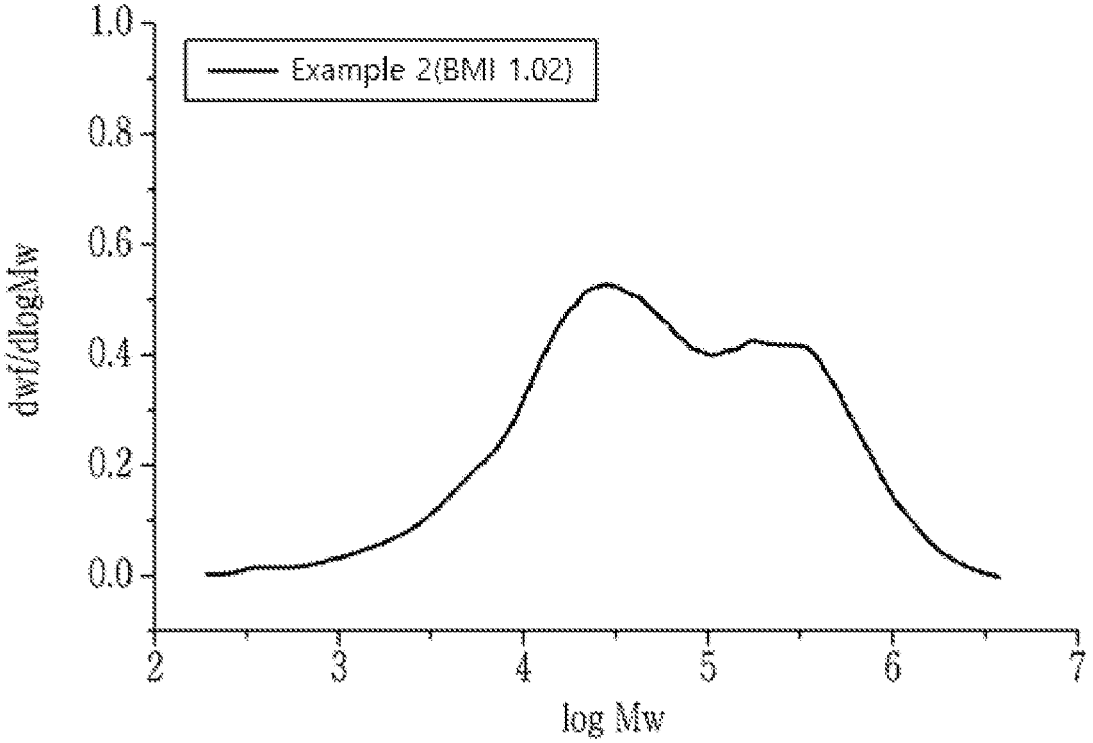

【FIG. 3】
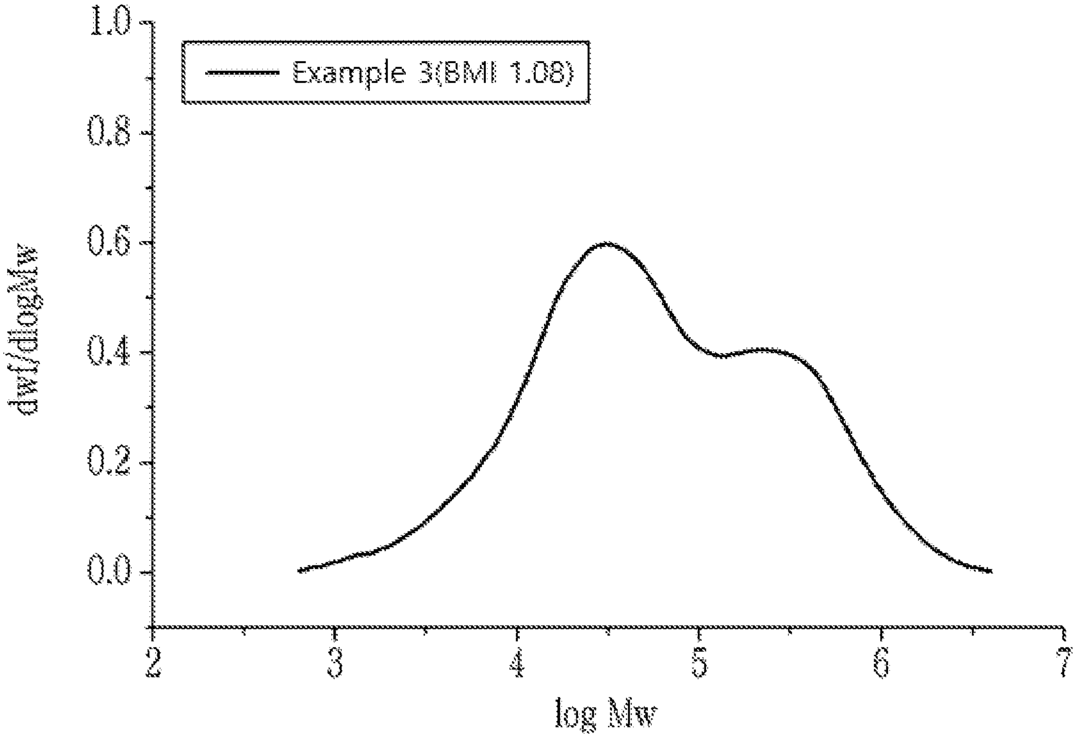

【FIG. 4】
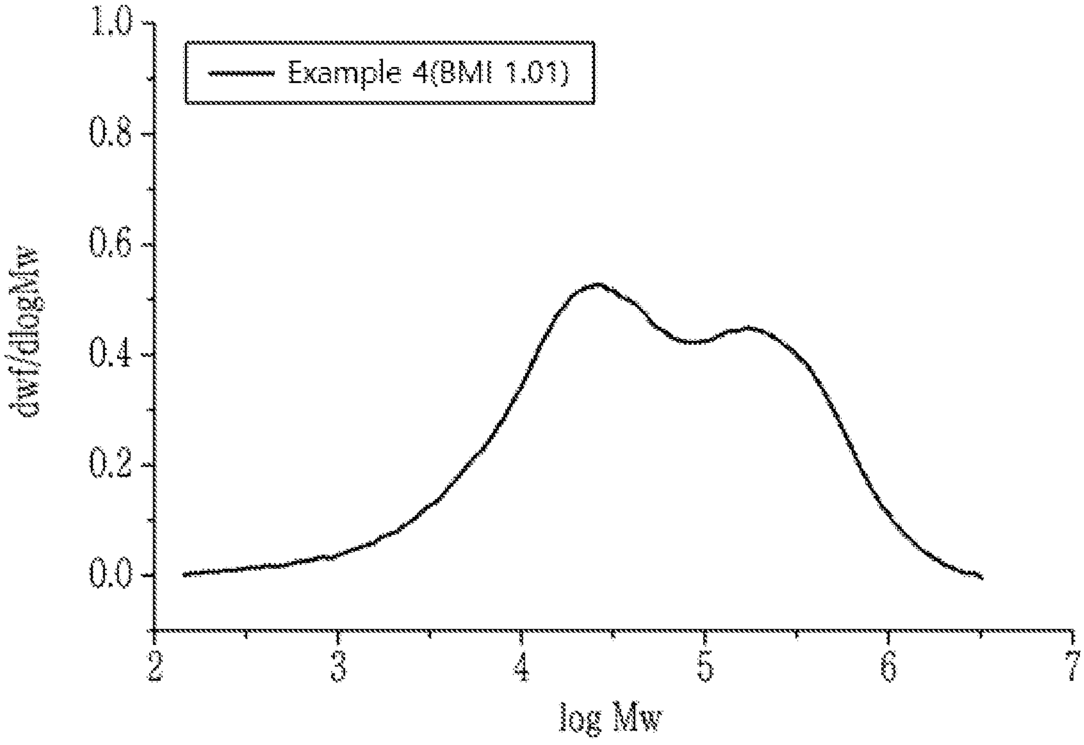

【FIG. 5】
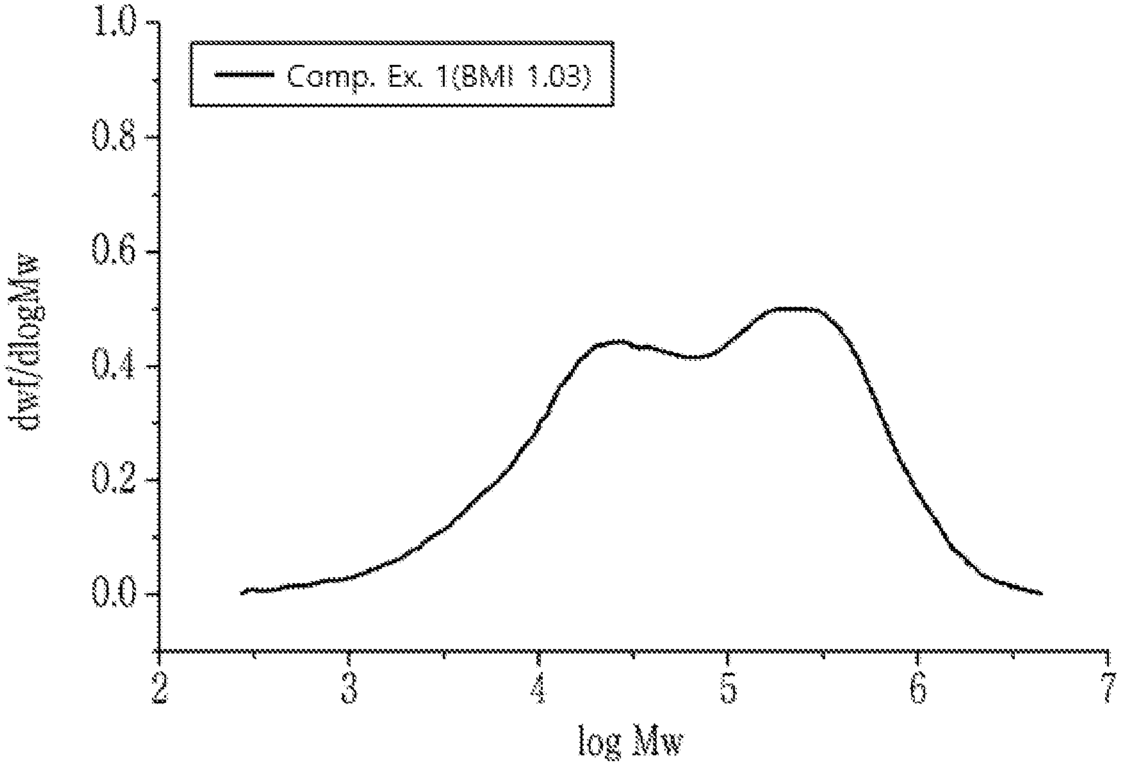

【FIG. 6】
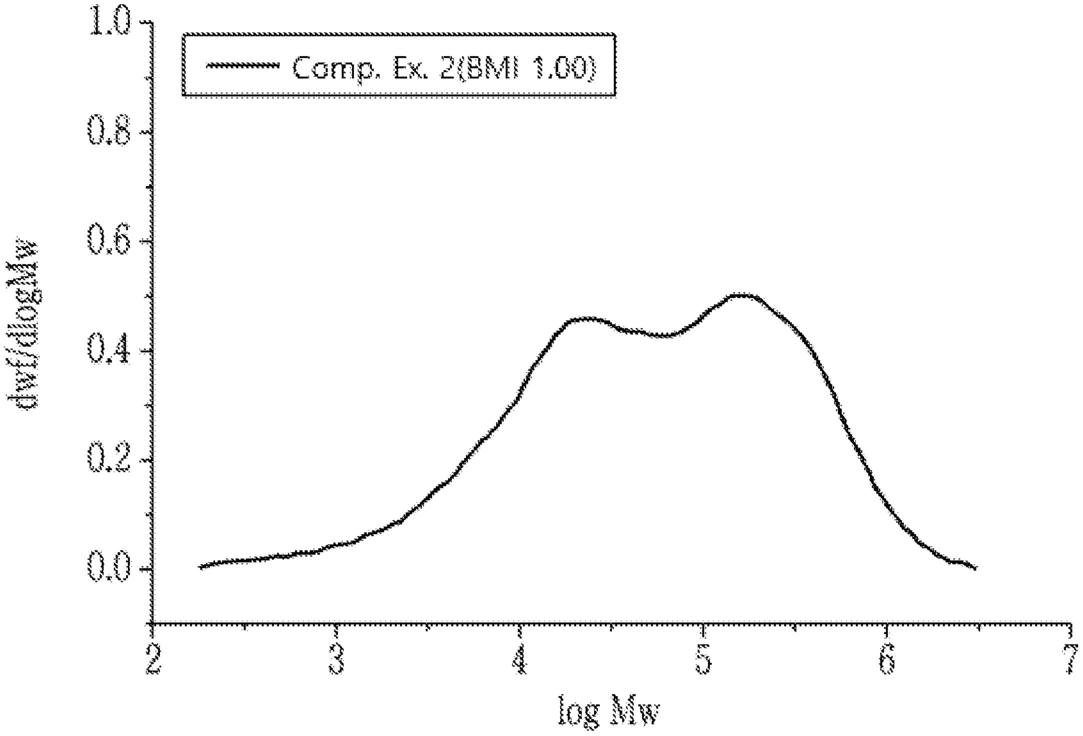

【FIG. 7】
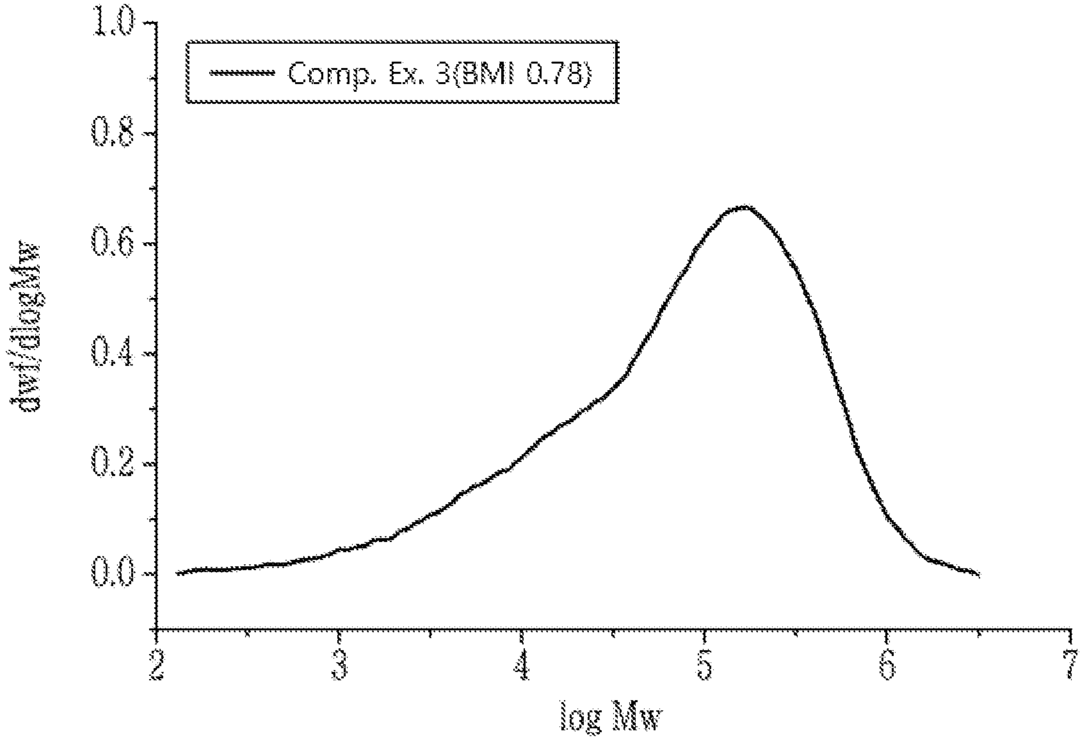

【FIG. 8】
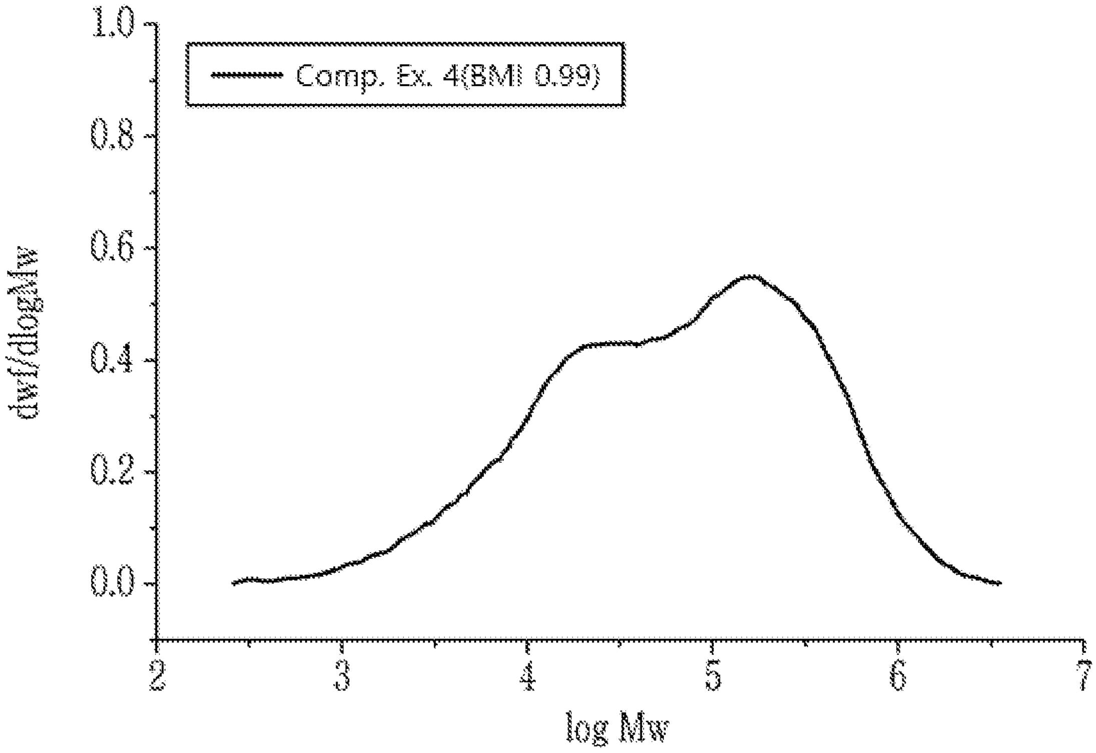

【FIG. 9】
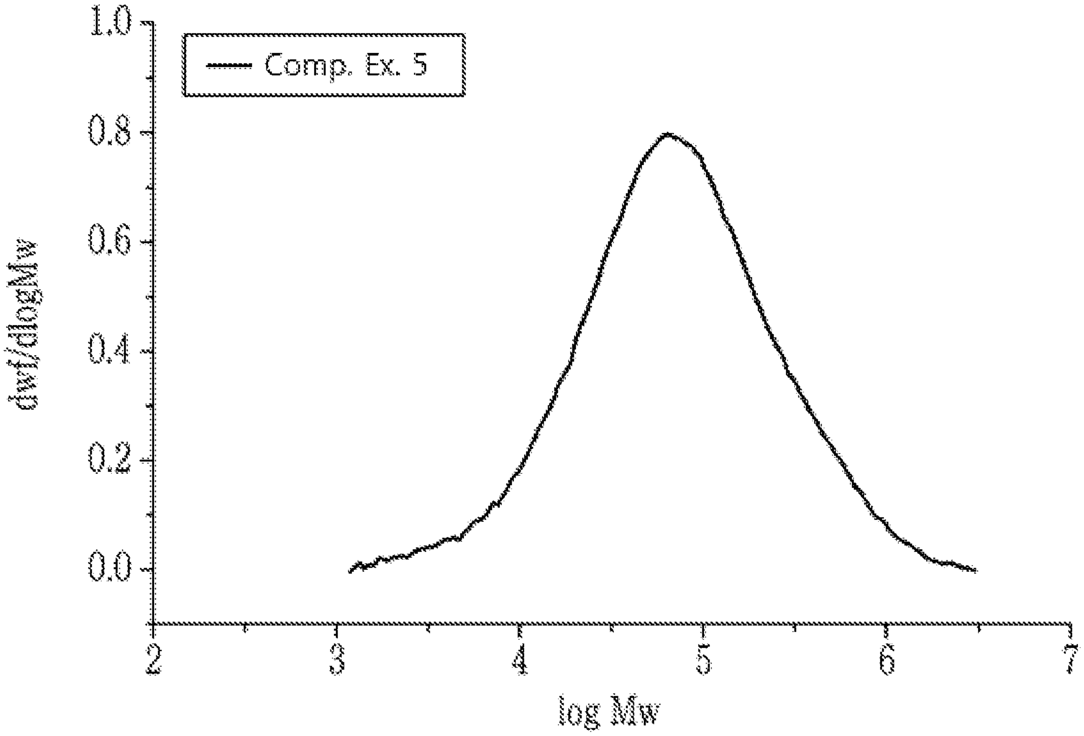

【FIG. 10】
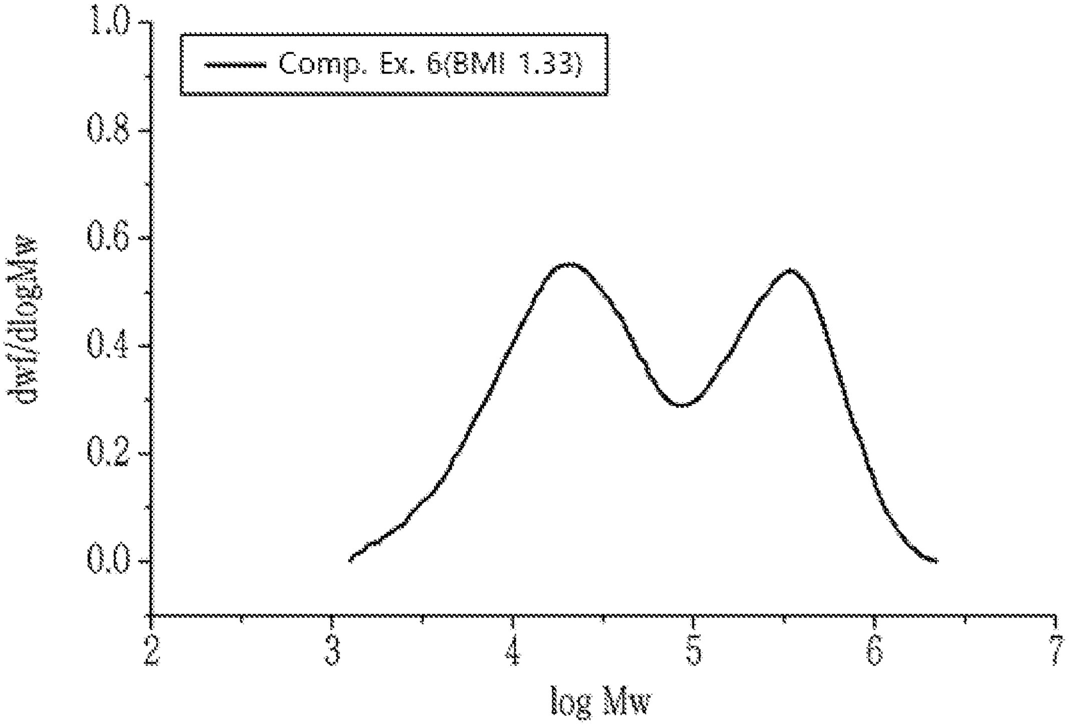

【FIG. 11】
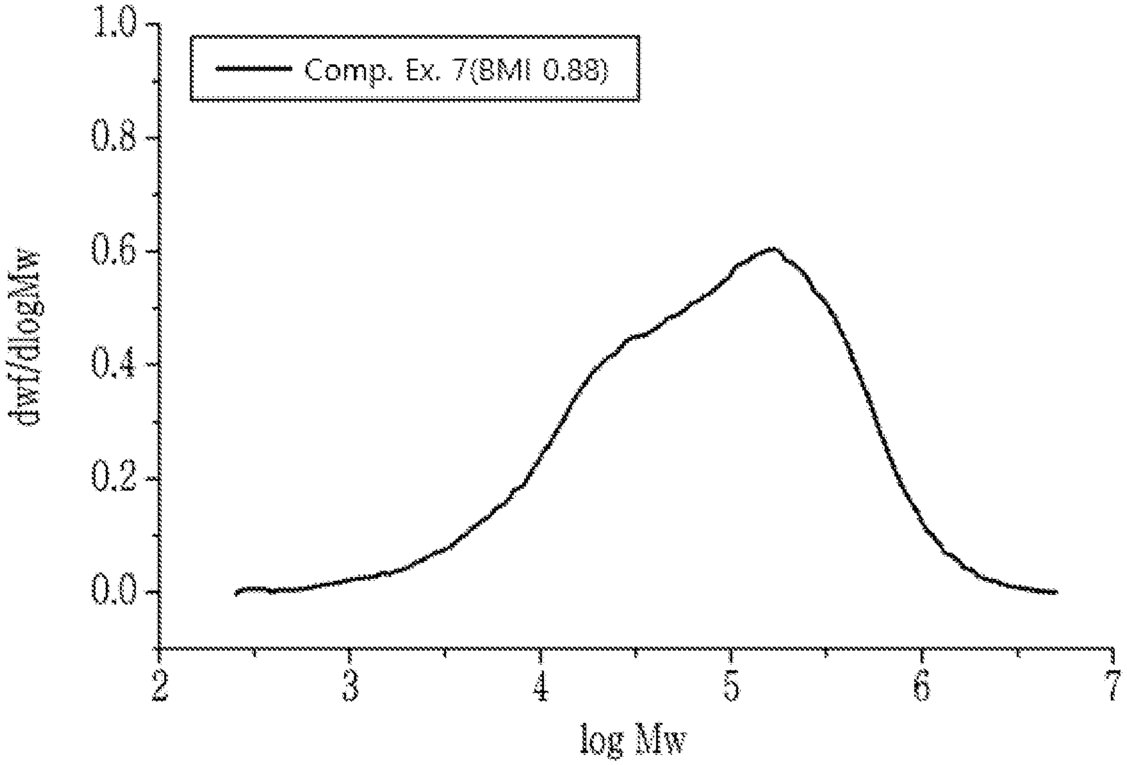

【FIG. 12】
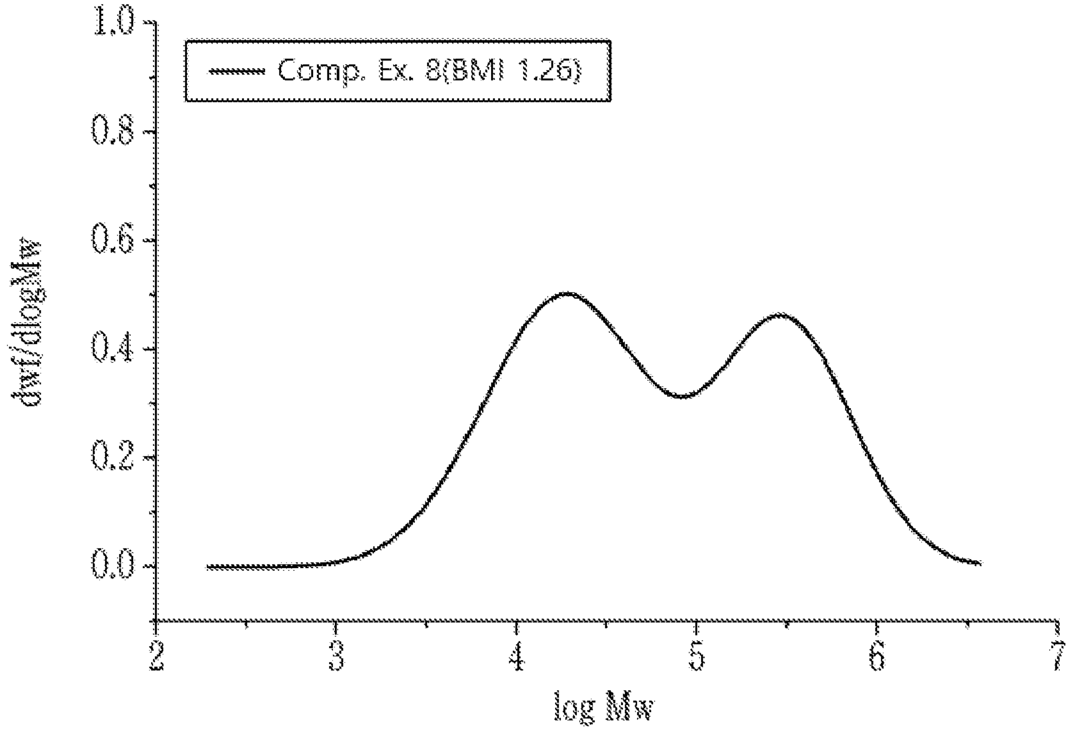

【FIG. 13】
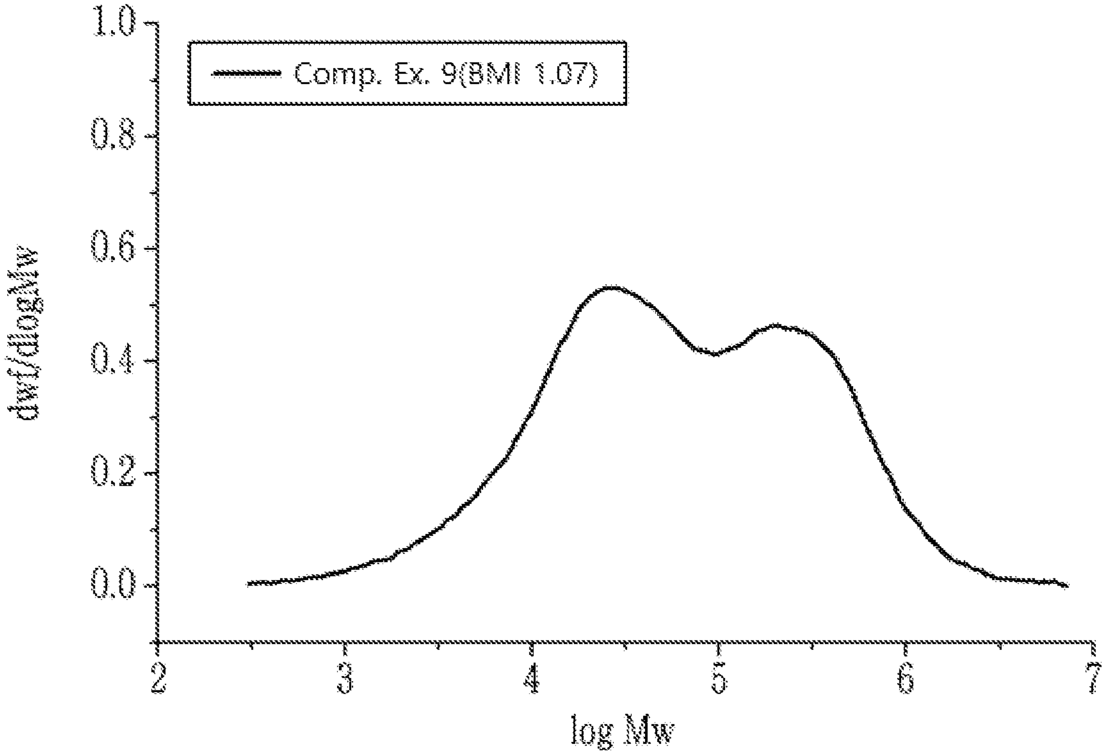

【FIG. 14】
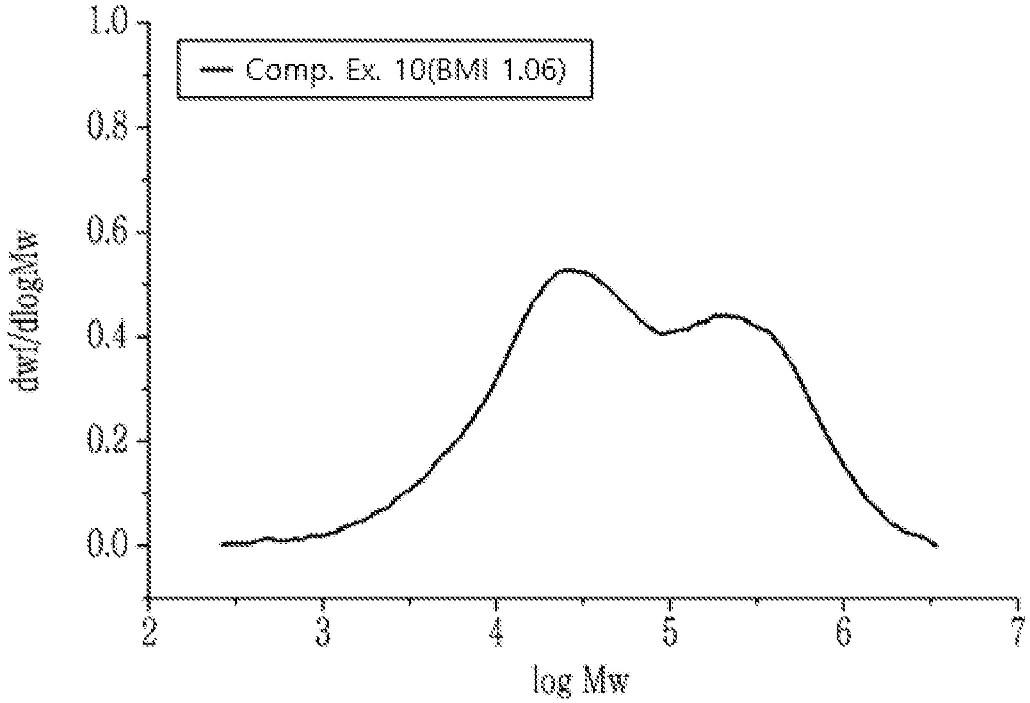

【FIG. 15】
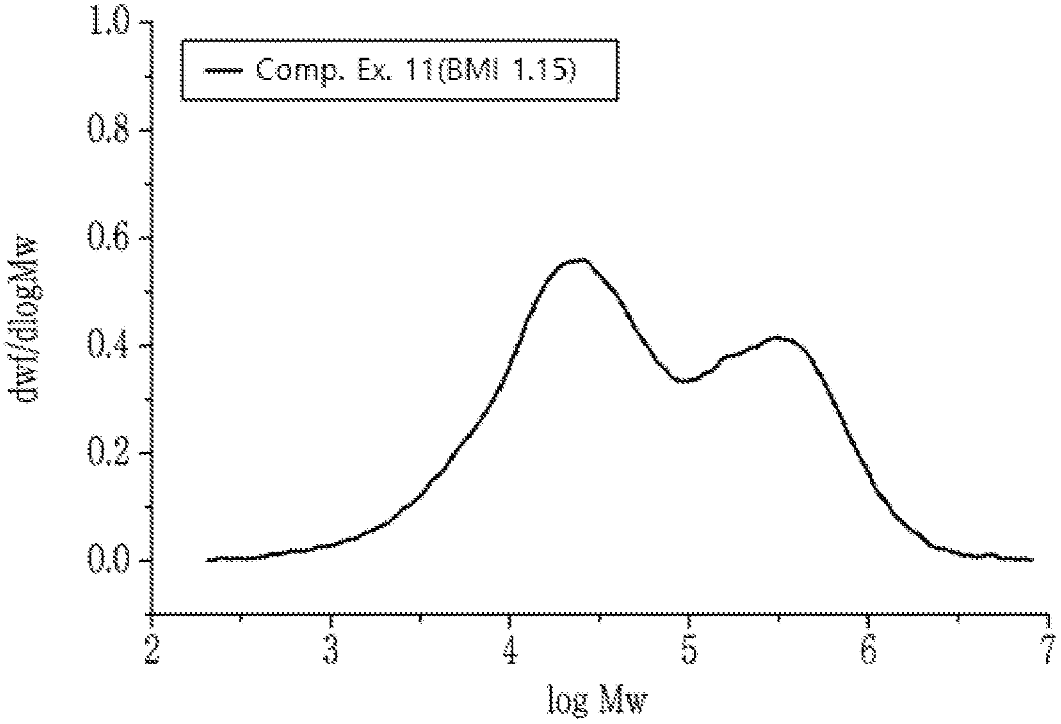

PELLET-TYPE POLYETHYLENE RESIN COMPOSITION AND METHOD FOR PREPARING THE SAME

CROSS-REFERENCE TO RELATED APPLICATION

The present application is based on, and claims priority from, Korean Patent Application Nos. 10-2020-0103997 and 10-2021-0103418, filed on Aug. 19, 2020, and Aug. 5, 2021, respectively, the disclosures of which are hereby incorporated by reference herein in their entirety.

TECHNICAL FIELD

The present invention relates to a pellet-type polyethylene resin composition capable of improving pipe pressure resistance property, dimensional stability, and processability at the same time, and a method for preparing the same.

BACKGROUND ART

Polyethylene of Raised Temperature resistance (PE-RT) type II exhibits high pressure resistance property of minimum required strength (MRS) of 9.3 MPa or more at high temperatures even without crosslinking. Accordingly, it has been used in various fields for transferring hot water, such as a water supply pipe, a hot water supply pipe, etc. Recently, its maximum diameter of 160 mm or less has been expanded to 250 mm or less, and the scope of its application is being expanded to more areas.

PE-RT with a large diameter of 200 mm or more requires high resin viscosity due to dimensional stability related to prevention of slumping of a thick pipe during pipe extrusion. However, the high viscosity increases a processing load and causes deceleration of a line speed, leading to deterioration of processability.

Accordingly, it is necessary to develop polyethylene capable of improving pipe pressure resistance property, dimensional stability for large diameters, and processability with a good balance.

DISCLOSURE

Technical Problem

There is provided a pellet-type polyethylene resin composition capable of improving pipe pressure resistance property, dimensional stability, and processability at the same time, and a method of preparing the same.

There is also provided a pipe exhibiting excellent pressure resistance property, dimensional stability, and processability, which is manufactured by using the pellet-type polyethylene resin composition.

Technical Solution

According to one embodiment of the present invention, provided is a pellet-type polyethylene resin composition including an ethylene/1-hexene copolymer and satisfying the following conditions of (a1) to (a5):

(a1) Melt index ($MI_5$: measured at 190° C. under a load of 5.0 kg in accordance with ISO 1133-1): 0.40 g/10 min to 0.80 g/10 min (a2) Density (measured in accordance with ASTM D 1505): 0.945 g/cm$^3$ to 0.950 g/cm$^3$ (a3) $F_{log\ Mw<5.0}$: 58% to 65%

($F_{log\ Mw<5.0}$ represents a value expressed as a ratio of, to the total area, the integral area of log Mw<5.0 fraction from a molecular weight distribution curve in gel permeation chromatography analysis of the pellet-type polyethylene resin composition specimen, wherein Mw represents a weight average molecular weight)

(a4) Bimodality index (BMI) according to the following Equation 1: 0.95 to 1.2

$$\text{Bimodality index}=[(\log Mw \text{ difference between bimodal peak } A \text{ and bimodal peak } B)/(FWHM_A\times FA+FWHM_B\times FB)] \quad \text{[Equation 1]}$$

(in Equation 1, the log Mw difference between bimodal peak A and bimodal peak B represents a distance between the two peaks, which is a value obtained by subtracting a maximum intensity value of the bimodal peak A, which is a low molecular weight fraction, from a maximum intensity value of the bimodal peak B, which is a high molecular weight fraction, after separating the low molecular weight fraction and the high molecular weight fraction through peak deconvolution of the molecular weight distribution curve using a Gaussian probability function in gel permeation chromatography analysis of the pellet-type polyethylene resin composition specimen, $FWHM_A$ and $FWHM_B$ represent full width half maximum values of the bimodal peak A and the bimodal peak B, respectively, and FA and FB represent area ratios obtained by integrating the bimodal peak A and the bimodal peak B, respectively), and (a5) Shear rate at the onset of melt fracture (shear rate$_{onset\ of\ M.F}$)(measured in accordance with ASTM D3835): 800 (l/s) or more.

According to another embodiment of the present invention, provided is a method of preparing the pellet-type polyethylene resin composition, the method including the steps of:

preparing an ethylene/1-hexene copolymer by performing a polymerization reaction of an ethylene monomer and a 1-hexene comonomer in the presence of a hybrid supported catalyst; and preparing a resin composition including the ethylene/1-hexene copolymer, and then extruding the resin composition in the form of pellets, wherein the hybrid supported catalyst includes a first transition metal compound including a compound represented by the following Chemical Formula 1 or a compound represented by the following Chemical Formula 2; a second transition metal compound represented by the following Chemical Formula 3; and a carrier;

the first transition metal compound and the second transition metal compound are included at a molar ratio of 1:0.5 to 1:1.4, the 1-hexene comonomer is introduced in an amount of 0.75 parts by weight to 10 parts by weight with respect to 100 parts by weight of the ethylene monomer:

$$(Cp^1R^a)_n(Cp^2R^b)M^1Z^1_{3-n} \quad \text{[Chemical Formula 1]}$$

in Chemical Formula 1, $M^1$ is a Group 4 transition metal;

$Cp^1$ and $Cp^2$ are the same as or different from each other, and each independently cyclopentadienyl substituted or unsubstituted with a $C_{1-20}$ hydrocarbyl group;

$R^a$ and $R^b$ are the same as or different from each other, and each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ is halogen, $C_{1-20}$ alkyl, $C_{2-20}$ alkenyl, $C_{7-40}$ alkylaryl, $C_{7-40}$ arylalkyl, $C_{6-20}$ aryl, a substituted or unsubstituted amino group, $C_{2-20}$ alkoxyalkyl, $C_{2-20}$ alkylalkoxy, or $C_{7-40}$ arylalkoxy;

n is 1 or 0;

[Chemical Formula 2]

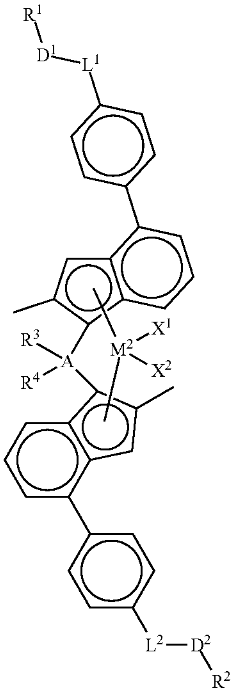

in Chemical Formula 2, $M^2$ is Group 4 transition metal;

A is carbon, silicon, or germanium;

$X^1$ and $X^2$ are the same as or different from each other, and each independently halogen or $C_{1-20}$ alkyl;

$L^1$ and $L^2$ are the same as or different from each other, and each independently $C_{1-20}$ alkylene;

$D^1$ and $D^2$ are oxygen;

$R^1$ and $R^2$ are the same as or different from each other, and each independently $C_{1-20}$ alkyl, $C_{2-20}$ alkenyl, $C_{6-20}$ aryl, $C_{7-40}$ alkylaryl, or $C_{7-40}$ arylalkyl;

$R^3$ and $R^4$ are the same as or different from each other, and each independently $C_{1-20}$ alkyl;

[Chemical Formula 3]

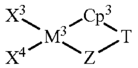

in Chemical Formula 3, $Cp^3$ is any one of ligands represented by the following Chemical Formulae 4a to 4d,

[Chemical Formula 4a]

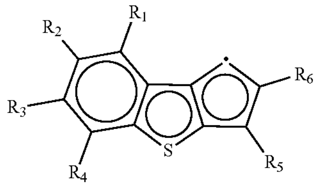

[Chemical Formula 4b]

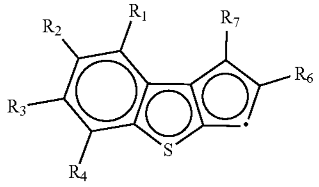

[Chemical Formula 4c]

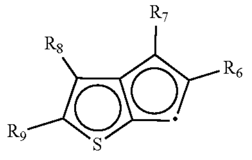

[Chemical Formula 4d]

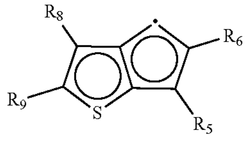

in Chemical Formulae 4a to 4d, $R_1$ to $R_9$ are the same as or different from each other, and each independently hydrogen, a $C_{1-30}$ hydrocarbyl group, or a $C_{1-20}$ hydrocarbyloxy group;

Z is —O—, —S—, —$NR_{10}$—, or —$PR_{11}$—;

$R_{10}$ and $R_{11}$ are each independently hydrogen, a $C_{1-20}$ hydrocarbyl group, a $C_{1-20}$ hydrocarbyl(oxy)silyl group, or a $C_{1-20}$ silylhydrocarbyl group;

$M^3$ is Ti, Zr, or Hf;

$X^3$ and $X^4$ are the same as or different from each other, and each independently halogen, a nitro group, an amido group, a phosphine group, a phosphide group, a $C_{1-30}$ hydrocarbyl group, a $C_{1-30}$ hydrocarbyloxy group, a $C_{2-30}$ hydrocarbyloxyhydrocarbyl group, —$SiH_3$, a $C_{1-30}$ hydrocarbyl(oxy)silyl group, a $C_{1-30}$ sulfonate group, or $C_{1-30}$ sulfone group;

T is

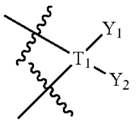

or

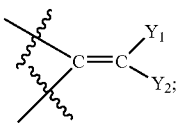

$T_1$ is C, Si, Ge, Sn, or Pb;

$Y_1$ and $Y_3$ are each independently hydrogen, a $C_{1-30}$ hydrocarbyl group, a $C_{1-30}$ hydrocarbyloxy group, a $C_{2-30}$ hydrocarbyloxyhydrocarbyl group, —$SiH_3$, a $C_{1-30}$ hydrocarbyl(oxy)silyl group, a halogen-substituted $C_{1-30}$ hydrocarbyl group, or —$NR_{12}R_{13}$;

$Y_2$ and $Y_4$ are each independently a $C_{2-30}$ hydrocarbyloxyhydrocarbyl group; and $R_{12}$ and $R_{13}$ are the same as or different from each other, and each independently any one of hydrogen and a $C_{1-30}$ hydrocarbyl group, or connected with each other to form an aliphatic or aromatic ring.

Further, according to still another embodiment of the present invention, provided is a pipe manufactured by using the above-described pellet-type polyethylene resin composition.

Effect of the Invention

A pellet-type polyethylene resin composition according to the present invention exhibits excellent dimensional stability by increasing viscosity of a processing area by reducing a melt index (MI) during preparation, and also has a bimodal structure with an enhanced content of a low molecular weight fraction to reduce occurrence of melt fracture and to improve a line speed. As a result, the pressure resistance property, dimensional stability, and processability may be improved with a good balance. Accordingly, it is particularly useful for the manufacture of pipes, especially, large-diameter PE-RT pipes.

BRIEF DESCRIPTION OF DRAWINGS

FIGS. 1 to 4 show graphs showing results of gel permeation chromatography analysis of pellet-type polyethylene resin compositions of Examples 1 to 4, respectively;

FIGS. 5 to 12 show graphs showing results of gel permeation chromatography analysis of pellet-type polyethylene resin compositions of Comparative Examples 1 to 8, respectively;

FIG. 13 shows a graph showing a result of gel permeation chromatography analysis of a polyethylene resin composition of Comparative Example 9; and FIGS. 14 to 15 show graphs showing results of gel permeation chromatography analysis of pellet-type polyethylene resin compositions of Comparative Examples 10 and 11, respectively.

BEST MODE FOR CARRYING OUT THE INVENTION

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

The present invention may be variously modified and have various forms, and specific exemplary embodiments are illustrated and explained in detail below. However, it is not intended to limit the present invention to the specific exemplary embodiments and it must be understood that the present invention includes every modifications, equivalents, or replacements included in the spirit and technical scope of the present invention.

Hereinafter, a pellet-type polyethylene resin composition according to specific embodiments of the present invention, a method of preparing the same, and a pipe manufactured by using the same will be described.

In the present invention, when a polyethylene resin composition is prepared, an ethylene/1-hexene copolymer is polymerized using a hybrid supported catalyst including heterogeneous transition metal compounds having specific structures, and is extruded and pelletized to have an optimal combination of physical properties which are required for the manufacture of pipes, particularly, large-diameter pipes, and as a result, pressure resistance property, dimensional stability, and processability may be improved with a good balance.

Specifically, the pellet-type polyethylene resin composition according to one embodiment of the present invention includes an ethylene/1-hexene copolymer and satisfies the following conditions of (a1) to (a5):

(a1) Melt index ($MI_5$: measured at 190° C. under a load of 5.0 kg in accordance with ISO 1133-1): 0.40 g/10 min to 0.80 g/10 min (a2) Density (measured in accordance with ASTM D 1505): 0.945 g/cm$^3$ to 0.950 g/cm$^3$ (a3) $F_{log\ Mw<5.0}$: 58% to 65%

($F_{log\ Mw}<5.0$ represents a value expressed as a ratio of, to the total area, the integral area of log Mw<5.0 fraction from a molecular weight distribution curve in gel permeation chromatography analysis of the pellet-type polyethylene resin composition specimen, wherein Mw represents a weight average molecular weight)

(a4) Bimodality index (BMI) according to the following Equation 1: 0.95 to 1.2

$$\text{Bimodality index}=[(\log Mw \text{ difference between bimodal peak } A \text{ and bimodal peak } B)/(FWHM_A \times FA + FWHM_B \times FB)] \quad \text{[Equation 1]}$$

(in Equation 1, the log Mw difference between bimodal peak A and bimodal peak B represents a distance between the two peaks, which is a value obtained by subtracting a maximum intensity value of the bimodal peak A, which is a low molecular weight fraction, from a maximum intensity value of the bimodal peak B, which is a high molecular weight fraction, after separating the low molecular weight fraction and the high molecular weight fraction using peak deconvolution of the molecular weight distribution curve in gel permeation chromatography analysis of the pellet-type polyethylene resin composition specimen, $FWHM_A$ and $FWHM_B$ represent full width half maximum values of the bimodal peak A and the bimodal peak B, respectively, and FA and FB represent area ratios obtained by integrating the bimodal peak A and the bimodal peak B, respectively), and (a5) Shear rate at the onset of melt fracture (shear $rate_{onset\ of\ M.F}$) (measured in accordance with ASTM D3835): 800 (l/s) or more.

Further, the pellet-type polyethylene resin composition may further satisfy one or more, two or more, three or more, or six or more of the following conditions of (b1) to (b6), while satisfying the conditions of (a1) to (a5):

(b1) Melt flow rate ratio ($MI_{21.6}/MI_{2.16}$, a value obtained by dividing a melt index value measured at 190° C. under a load of 21.6 kg in accordance with ASTM 1238 by a melt index value measured at 190° C. under a load of 2.16 kg in accordance with ASTM 1238): 96 or more (b2) Polydispersity index (PDI): 10 to 15

(b3) Extensional viscosity (measured in accordance with ASTM D4065): 300,000 Pa·S or more (b4) Processing area viscosity (η at 25/s, measured in accordance with ISO 3219): 6,000 Pa·s or less (b5) Yield stress ($\sigma_{yield}$, measured at 23° C. and a speed of 50 mm/min in accordance with ISO 527 after preparing a specimen according to ASTM D638 type 4 standards): 240 kg/cm$^2$ or more (b6) Strain hardening modulus (the slope obtained by linear fitting a true strain of 8 to 12 in a Neo-Hookean constitutive model curve (x axis:

$$\lambda^2 - \frac{1}{\lambda},$$

y axis: $\sigma_{true}$, wherein λ represents a draw ratio, and $\sigma_{true}$ represents a true stress) which is obtained from a stress/strain curve under conditions of 80° C. and 20 mm/min in accordance with ISO 18488): 22.0 MPa to 25 MPa.

In the present invention, a pellet or a pellet-type is a small particle or piece formed by extrusion of raw material, and includes all the shape classified as a pellet in the art, including circle, flat, flake, polygon, rod shapes, etc.

With regard to the existing powdered polyethylene resin composition, the type of antioxidant is limited, and there is a large difference in the content of antioxidant according to each powder, and for this reason, there is a problem in that articles manufactured using the same show great variation in physical properties.

In contrast, the polyethylene resin composition of the present invention is prepared in the form of pellets through melt extrusion after mixing components, and therefore, the components including the antioxidant in the pellets are uniformly mixed, and the resulting yarn may also exhibit uniform physical properties.

Meanwhile, the size of the pellet is not particularly limited as being appropriately determined according to its use and shape. However, in order to distinguish the pellet from powder generally having a small average diameter of about 1 mm, the pellet in the present invention is defined as having an average diameter of 2 mm or more. Specifically, the pellet in the present invention may have an average diameter of 2 mm or more, or 3 mm or more, 200 mm or less, or 100 mm or less, or 50 mm or less, or 10 mm or less, or 5 mm or less. In this regard, the "diameter" is the longest distance among any straight distances of the outer circumference surface of the pellet, and may be measured using imaging microscope, etc.

More specifically, the pellet-type polyethylene resin composition according to one embodiment of the present invention exhibits a low melt index ($MI_5$) of 0.40 g/10 min to 0.80 g/10 min by using a catalyst including heterogeneous transition metal compounds having specific structures at an optimal content ratio, and by including an ethylene/1-hexene copolymer prepared by controlling a feeding ratio of a comonomer.

In the present invention, the melt index of the polyethylene resin composition may be measured at 190° C. under a load of 5.0 kg in accordance with ISO 1133-1, and expressed as a weight (g) of the polymer molten for 10 minutes.

The melt index of the polyethylene resin composition affects dimensional stability and processability. When $MI_5$ is less than 0.40 g/10 min, the processing pressure may increase and processability may decrease, and when $MI_5$ is more than 0.80 g/10 min, dimensional stability may deteriorate due to high fluidity.

Generally, the melt index may be adjusted by controlling the type of catalyst and the input amount of hydrogen during the polymerization process, and the input amount of hydrogen is determined according to hydrogen reactivity of the catalyst to be used. In the present invention, a transition metal compound having low hydrogen reactivity is used to decrease the melt index of the prepared ethylene/1-hexene copolymer, thereby increasing viscosity in the processing area to improve dimensional stability. More specifically, the polyethylene resin composition may exhibit $MI_5$ of 0.40 g/10 min or more, or 0.45 g/10 min or more, or 0.48 g/10 min or more, or 0.50 g/10 min or more, and 0.80 g/10 min or less, or 0.75 g/10 min or less, or 0.74 g/10 min or less, or 0.60 g/10 min or less, or 0.55 g/10 min or less.

Further, the polyethylene resin composition according to one embodiment of the present invention may exhibit a high density of 0.945 g/$cm^3$ to 0.950 g/$cm^3$, together with the low MI as described above, and as a result, may exhibit excellent water pressure resistance and dimensional stability.

In the present invention, the density of the polyethylene resin composition may be measured in accordance with ASTM D 1505. When the density of the polyethylene resin composition is more than 0.950 g/$cm^3$, the water pressure resistance property may deteriorate due to the excessively high density, and when the density is less than 0.945 g/$cm^3$, the dimensional stability may deteriorate. More specifically, the pellet-type polyethylene resin composition may exhibit a density of 0.945 g/$cm^3$ or more, or 0.9455 g/$cm^3$ or more, or 0.9456 g/$cm^3$ or more, and 0.950 g/$cm^3$ or less, or 0.949 g/$cm^3$ or less, or 0.948 g/$cm^3$ or less, or 0.9477 g/$cm^3$ or less, or 0.946 g/$cm^3$ or less.

Further, the pellet-type polyethylene resin composition according to one embodiment of the present invention may exhibit $F_{log\ Mw<5.0}$ of 58% to 65%.

$F_{log\ Mw}$<5.0 is a value expressed as a ratio of, to the total area, the integral area of log Mw<5.0 fraction from a molecular weight distribution curve (GPC curve) of Log Mw on the x-axis versus dwf/dLogMw (mass detector response) on the y-axis through gel permeation chromatography (GPC) analysis. Therefore, it means a measure of processability related to the fluidity of the resin composition. At this time, the GPC analysis may be performed using a Waters PL-GPC220 instrument equipped with a Polymer Laboratories PLgel MIX-B 300 mm-length column under conditions of a measuring temperature of 160° C. and a flow rate of 1 mL/min using 1,2,4-trichlorobenzene as a solvent. Detailed descriptions of the method and conditions for GPC analysis are as described in Experimental Example below.

As the polyethylene resin composition has $F_{log\ Mw<5.0}$ in the above range, MFRR is increased, and as a result, it may exhibit excellent processability. When $F_{log\ Mw<5.0}$ is less than 58%, the viscosity of the processing area is high, melt fracture may occur, and the low shear rate at the onset of melt fracture (shear $rate_{onset\ of\ M.F}$) of less than 800 (l/s) is exhibited, and thus processability may be greatly reduced. When $F_{log\ Mw<5.0}$ is more than 65%, dimensional stability and water pressure resistance property may deteriorate. More specifically, the polyethylene resin composition may exhibit $F_{log\ Mw<5.0}$ of 58% or more, or 58.5% or more, or 60% or more, and 65% or less, or 64% or less, or 63.8% or less, or 63.5% or less.

Further, the pellet-type polyethylene resin composition according to one embodiment of the present invention may have a bimodal molecular weight distribution upon GPC analysis, and may exhibit 0.95 to 1.2 of a bimodality index (BMI) according to the following Equation 1.

The bimodality index (BMI) is an index indicating bimodality in the molecular weight distribution curve according to GPC analysis, and may be calculated according to the following Equation 1:

$$\text{Bimodality index}=[(\log Mw \text{ difference between bimodal peak } A \text{ and bimodal peak } B)/(FWHM_A \times FA + FWHM_B \times FB)] \quad \text{[Equation 1]}$$

in Equation 1, the log Mw difference between bimodal peak A and bimodal peak B represents a distance between the two peaks, which is a value obtained by subtracting a maximum intensity value of the bimodal peak A, which is a low molecular weight fraction, from a maximum intensity value of the bimodal peak B, which is a high molecular weight fraction, after separating the low molecular weight fraction and the high molecular weight fraction through peak deconvolution of the molecular weight distribution curve (GPC curve) of Log Mw on the x-axis versus dwf/dLogMw (mass detector response) on the y-axis using a Gaussian probability function during gel permeation chromatography analysis of the pellet-type polyethylene resin composition specimen, $FWHM_A$ and $FWHM_B$ represent full width half maximum values of the bimodal peak A and the bimodal peak B, respectively, and FA and FB represent area ratios obtained by integrating the bimodal peak A and the bimodal peak B, respectively).

Meanwhile, in the present invention, the bimodal peak A and the bimodal peak B represent a peak corresponding to the low molecular weight fraction and a peak corresponding to the high molecular weight fraction, respectively, when the low molecular weight fraction and the high molecular weight fraction are separated through peak deconvolution of the molecular weight distribution curve using a Gaussian probability function during GPC analysis of the polyethylene resin composition specimen. At this time, the GPC analysis may be performed using a Waters PL-GPC220 instrument equipped with a Polymer Laboratories PLgel MIX-B 300 mm-length column under conditions of a measuring temperature of 160° C. and a flow rate of 1 mL/min using 1,2,4-trichlorobenzene as a solvent. Detailed descriptions of the analysis method and conditions are as described in Experimental Example below.

In the case of bimodal polyethylene resin composition, when a molecular weight difference is large, a low molecular weight fraction that is not well mixed due to phase separation is separated and exists on the surface. Therefore, a surface defect called melt fracture is generated due to a difference in a stress relaxation time between the inside and the outside.

When the bimodality index is less than 0.95, bimodality is too small and the molecular weight difference between the low molecular weight fraction and the high molecular weight fraction is small, and thus processability and physical properties may not be balanced. When the bimodality index is more than 1.2, bimodality is too large, the onset of melt fracture may be accelerated, and the occurrence of melt fracture may also be increased. The polyethylene resin composition has a bimodal molecular weight distribution that meets the bimodality index conditions, in which the content of the low molecular weight fraction is enhanced as described above, and thus compensates for the decrease in processability due to low MI, and as a result, generation of the melt fracture may be reduced and the line speed may be increased. More specifically, the polyethylene resin composition may have a bimodality index of 0.95 or more, or 0.97 or more, or 1 or more, or 1.01 or more, or 1.015 or more, or 1.02 or more, and 1.2 or less, or 1.15 or less, or 1.1 or less, or 1.08 or less, or 1.05 or less.

Further, the pellet-type polyethylene resin composition according to one embodiment of the present invention may exhibit a melt flow rate ratio (MFRR, $MI_{21.6}/MI_{2.16}$) of 96 or more.

In general, MFRR is used as a value indicating the effect of shear thinning, and is affected by the molecular weight distribution and the melt index of the resin composition. The polyethylene resin composition satisfies the molecular weight distribution as described above, specifically, $F_{log\ Mw<5.0}$ of 58% to 65%, and has the low melt index to exhibit the high MFRR of 96 or more, thereby exhibiting excellent processability.

More specifically, the polyethylene resin composition may exhibit MFRR of 96 or more, or 100 or more, or 101 or more, or 103 or more, and 150 or less, or 130 or less, or 120 or less, or 115 or less, or 110 or less.

Meanwhile, in the present invention, MFRR of the polyethylene resin composition is a value obtained by dividing a melt index (MI21.6) value measured at 190° C. under a load of 21.6 kg in accordance with ASTM 1238 by a melt index (MI2.16) value measured at 190° C. under a load of 2.16 kg in accordance with ASTM 1238.

Further, the pellet-type polyethylene resin composition according to one embodiment of the present invention may exhibit a high polydispersity index (PDI) of 10 or more, specifically 10 to 15, together with the above-described physical properties, and as a result, the melt fracture may be reduced.

When the PDI is less than 10, the melt fracture may increase, and when the PDI is more than 15, kneadability between the low molecular weight fraction and the high molecular weight fraction is reduced, which makes it difficult to achieve uniform physical properties of a pipe. Much more specifically, the PDI of the polyethylene resin composition may be 10 or more, or 10.5 or more, or 11 or more, and 15 or less, or 14.6 or less, or 14.5 or less, 14 or less, or 12 or less, or 11.5 or less, or 11.06 or less.

In the present invention, PDI(Mw/Mn) may be calculated from the measured values of Mw and Mn of the polyethylene resin composition, which are measured using GPC. At this time, the GPC analysis may be performed using a Waters PL-GPC220 instrument equipped with a Polymer Laboratories PLgel MIX-B 300 mm-length column under conditions of a measuring temperature of 160° C. and a flow rate of 1 mL/min using 1,2,4-trichlorobenzene as a solvent. Mw and Mn values may be derived from the analysis results using a calibration curve created using polystyrene standards. Specific analysis methods and conditions are as described in Experimental Example below. Detailed descriptions of the analysis method and conditions are as described in Experimental Example below.

As described above, since the pellet-type polyethylene resin composition according to one embodiment of the present invention has the low MI and high density, and the bimodal structure, in which the content of the low molecular weight fraction is enhanced, and the optimal range of bimodality index, water pressure resistance property, dimensional stability, and processability may be improved at the same time with a good balance.

Specifically, a shear rate (Shear $rate_{on\_set\ of\ M.F}$) at the onset of melt fracture (melt fracture on-set point) of the pellet-type polyethylene resin composition may be 800 (l/s) or more, as measured in accordance with ASTM D3835 using a capillary rheometer.

The shear $rate_{on\_set\ of\ M.F}$ is a value indicating the pipe processing characteristics of the polyethylene resin composition. As the shear $rate_{on\_set\ of\ M.F}$ is higher, it may exhibit better pipe processability and a production speed is faster. As the shear $rate_{on\_set\ of\ M.F}$ is lower, particularly, less than 800 (l/s), the processability is deteriorated, and as a result, the productivity is lowered. The polyethylene resin composition may exhibit the high shear $rate_{on\_set\ of\ M.F}$ of 800 (l/s) or more, thereby exhibiting excellent processability. More specifically, the shear $rate_{on\_set\ of\ M.F}$ of the polyethylene resin composition may be 800 (l/s) or more, or 900 (l/s) or more, or 1000 (l/s) or more, or more than 1000 (l/s). In general, when the shear $rate_{on\_set\ of\ M.F}$ is high by exceeding 1000 (l/s), there is no point in evaluation because it exhibits excellent processability by exceeding the capacity of production facility such as cooling equipment, etc. However, considering the resin processing area, the upper limit of the shear $rate_{on\_set\ of\ M.F}$ may be 1200 (l/s), i.e., the shear $rate_{on\_set\ of\ M.F}$ may be 1200 (l/s) or less.

Meanwhile, the shear $rate_{on\_set\ of\ M.F}$ of the polyethylene resin composition may be measured in accordance with ASTM D3835, and detailed descriptions of the measurement method and conditions are as described in Experimental Example below.

Further, the pellet-type polyethylene resin composition may exhibit a high extensional viscosity of 300,000 Pa·S or more, as measured using dynamic mechanical analysis (DMA) in accordance with ASTM D4065.

When the extensional viscosity is less than 300,000 Pa·S, dimensional stability may deteriorate, resulting in pipe dimensional nonuniformity of 250 mm or more. However, the polyethylene resin composition may exhibit further increased dimensional stability, when it has a high extensional viscosity of 300,000 Pa·S or more, in addition to the above-described combination of physical properties. More specifically, the polyethylene resin composition may exhibit a high extensional viscosity of 300,000 Pa·S or more, or 300,100 Pa·S or more, or 302,000 Pa·S or more, or 305,000 Pa·S, or more, or 310,000 Pa·S or more, or 315,000 Pa·S or more, or 316,000 Pa·S or more, or 320,000 Pa·S or more. However, considering that pipe productivity may decrease due to an increase in the processing viscosity when the extensional viscosity is too high, the polyethylene resin composition may exhibit an extensional viscosity of 400,000 Pa·S or less, or 380,000 Pa·S or less, or 350,000 Pa·S or less, or 349,000 Pa·S or less, or 345,000 Pa·S or less, or 340,000 Pa·S or less.

Further, the pellet-type polyethylene resin composition may exhibit a low processing area viscosity (η at 25/s) of 6,000 Pa·s or less, as a viscosity is measured under conditions of 190° C. and 25/s using a rotational rheometer in accordance with ISO 3219.

When the processing area viscosity is high by exceeding 6,000 Pa·s, the occurrence of melt fracture may increase and the shear rate may decrease, leading to deterioration of processability. However, when the polyethylene resin composition has a low processing area viscosity of 6,000 Pa·s or less, in addition to the above-described combination of physical properties, the occurrence of melt fracture may be greatly reduced, and processability may be further improved. More specifically, the polyethylene resin composition may exhibit a processing area viscosity of 6,000 Pa·s or less, or 5,800 Pa·s or less, or 5,600 Pa·s or less, or 5,550 Pa·s or less, or 5,500 Pa·s or less. However, considering that dimensional stability may decrease when the processing area viscosity is too low, the polyethylene resin composition may exhibit a processing area viscosity of 4,500 Pa·S or more, or 4,800 Pa·S, or 5,000 Pa·s or more, or 5,200 Pa·S or more, or 5,300 Pa·S or more.

Further, the pellet-type polyethylene resin composition may exhibit a yield stress ($\sigma_{yield}$) of 240 $kg/cm^2$ or more, as measured at 23° C. and a speed of 50 mm/min in accordance with ISO 527 after preparing a specimen according to ASTM D638 type 4 standards).

The yield stress refers to the tensile strength property of the polyethylene resin composition, and when the yield stress is less than 240 $kg/cm^2$, the resistance to structural strain by an external force is lowered, and thus the pressure resistance property may be lowered. In contrast, as the yield stress is higher, it exhibits the better tensile strength property. However, the yield stress has a nearly linear relationship with density, and thus an increase in the yield stress means an increase in density. Therefore, when the density increases, the strength increases, whereas hardness lowers, leading to being easily broken, and as a result, the long-term pressure stability is lowered. Accordingly, when the yield stress is more than 280 $kg/cm^2$, the density exceeds the above-mentioned range, and the effect of absorbing an external impact may be reduced. However, when the yield stress is increased while maintaining the density in the above-described range, in particular, even though the yield stress exceeds 260 $kg/cm^2$, it may exhibit excellent tensile strength property and water pressure resistance property without deterioration in the effect of absorbing an external impact. More specifically, the polyethylene resin composition may exhibit a yield stress of 240 $kg/cm^2$ or more, or 242 $kg/cm^2$ or more, or 244 $kg/cm^2$ or more, or 245 $kg/cm^2$ or more, and 280 $kg/cm^2$ or less, or 265 $kg/cm^2$ or less, or 263 $kg/cm^2$ or less, or 260 $kg/cm^2$ or less, or 255 $kg/cm^2$ or less.

Further, the pellet-type polyethylene resin composition may exhibit a strain hardening modulus ($\langle Gp \rangle$) of 22 MPa to 25 MPa.

The strain hardening modulus is a physical property index indicating the water pressure resistance property, and is the slope obtained by linear fitting a true strain of 8 to 12 in a Neo-Hookean constitutive model curve (x axis:

$$\lambda^2 - \frac{1}{\lambda},$$

y axis: $\sigma_{true}$, wherein λ represents a draw ratio, and $\sigma_{true}$ represents a true stress) which is obtained from a stress/strain curve under conditions of 80° C. and 20 mm/min in accordance with ISO 18488. Detailed descriptions of the method and conditions for measuring the strain hardening modulus are as described in Experimental Example below.

When the strain hardening modulus of the polyethylene resin composition satisfies the above-mentioned range, it may exhibit a minimum required strength (MRS) of 9.3, when manufacturing a pipe, which is evaluated using the ISO 9080 standard. When the strain hardening modulus deviates from the above range, it does not meet the MRS of 9.3 and exhibits deteriorated water pressure resistance property. More specifically, the polyethylene resin composition may exhibit a strain hardening modulus of 22 MPa or more, or 23 MPa or more, or 23.2 MPa or more, or 23.5 MPa, and 25 MPa or less, or 24.5 MPa or less, or 24 MPa or less.

Further, the polyethylene resin composition may exhibit a characteristic stress (C.S) of 11 MPa or more, more specifically, 11 MPa to 14 MPa.

The C.S is a stress value at a point where two extrapolated straight lines meet, after each plotting yield stress and drawing stress of four stress-strain curves according to different draw rates, and represents a long-term pressure resistance property of the resin composition. The yield stress is the stress value at the maximum point of stress for each draw rate, the drawing stress is the stress value at 100% of the strain, and the yield stress and the drawing stress for each draw rate have a linear function. The stress corresponding to the intersection of the two linear functions is C.S. In this regard, the draw rate may be selected in the range of 0.001 mm/mm/s to 3 mm/mm/s, and the strain may vary in the range of 10^0 (/h) to 10^3 (/h).

As the C.S is higher, the long-term pressure resistance property is better. However, like the yield stress, C.S also has an almost linear relationship with density. Therefore, when C.S exceeds 14, the density also increases and deviates from the above-described range of density, and as a result, long-term heat resistance stability may decrease due to a decrease in hardness. However, when only C.S is increased while maintaining the density in the range as described above, excellent long-term pressure resistance property may be achieved without deterioration in the effect of absorbing an external impact even when the C.S exceeds 14. More specifically, the polyethylene resin composition may exhibit C.S of 11 MPa or more, or 12 MPa or more, or 12.5 MPa or more, and 14 MPa or less, or 13.9 MPa or less, or 13.5 MPa or less, or 13 MPa or less.

The pellet-type polyethylene resin composition having the above-described physical properties according to one embodiment of the present invention may be prepared by a preparation method including the steps of: preparing an ethylene/1-hexene copolymer by performing a polymerization reaction of an ethylene monomer and a 1-hexene comonomer in the presence of a hybrid supported catalyst including a first transition metal compound including a compound represented by the following Chemical Formula 1 or a compound represented by the following Chemical Formula 2, a second transition metal compound represented by the following Chemical Formula 3, and a carrier; and preparing a resin composition including the ethylene/1-hexene copolymer, and then extruding the resin composition in the form of pellets, wherein the first transition metal compound and the second transition metal compound are included at a molar ratio of 1:0.5 to 1:1.4, the 1-hexene comonomer is introduced in an amount of 0.75 parts by weight to 10 parts by weight with respect to 100 parts by weight of the ethylene monomer. Accordingly, according to another embodiment of the present invention, provided is a method of preparing the above-described pellet-type polyethylene resin composition:

$(Cp^1R^a)_n(Cp^2R^b)M^1Z^1_{3-n}$ [Chemical Formula 1]

in Chemical Formula 1, $M^1$ is a Group 4 transition metal;

$Cp^1$ and $Cp^2$ are the same as or different from each other, and each independently cyclopentadienyl substituted or unsubstituted with a $C_{1-20}$ hydrocarbyl group;

$R^a$ and $R^b$ are the same as or different from each other, and each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ is halogen, $C_{1-20}$ alkyl, $C_{2-20}$ alkenyl, $C_{7-40}$ alkylaryl, $C_{7-40}$ arylalkyl, $C_{6-20}$ aryl, a substituted or unsubstituted amino group, $C_{2-20}$ alkoxyalkyl, $C_{2-20}$ alkylalkoxy, or $C_{7-40}$ arylalkoxy;

n is 1 or 0;

[Chemical Formula 2]

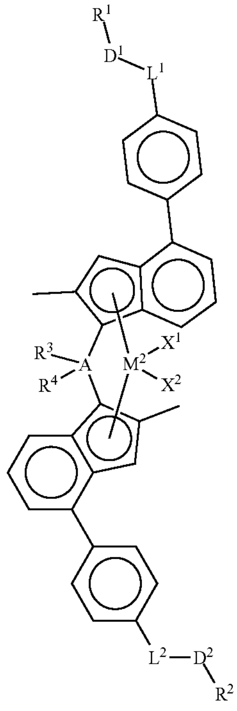

in Chemical Formula 2, $M^2$ is Group 4 transition metal;

A is carbon (C), silicon (Si), or germanium (Ge);

$X^1$ and $X^2$ are the same as or different from each other, and each independently halogen or $C_{1-20}$ alkyl;

$L^1$ and $L^2$ are the same as or different from each other, and each independently $C_{1-20}$ alkylene;

$D^1$ and $D^2$ are oxygen (O);

$R^1$ and $R^2$ are the same as or different from each other, and each independently $C_{1-20}$ alkyl, $C_{2-20}$ alkenyl, $C_{6-20}$ aryl, $C_{7-40}$ alkylaryl, or $C_{7-40}$ arylalkyl;

$R^3$ and $R^4$ are the same as or different from each other, and each independently $C_{1-20}$ alkyl;

[Chemical Formula 3]

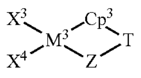

in Chemical Formula 3, $Cp^3$ is any one of ligands represented by the following Chemical Formulae 4a to 4d;

[Chemical Formula 4a]

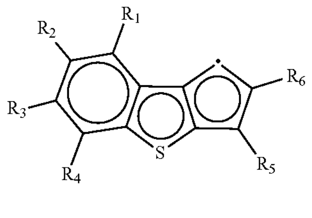

-continued

[Chemical Formula 4b]

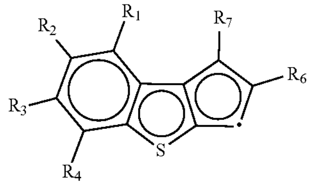

[Chemical Formula 4c]

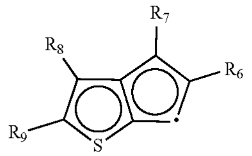

[Chemical Formula 4d]

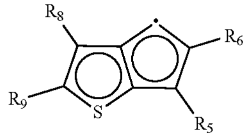

in Chemical Formulae 4a to 4d, $R_1$ to $R_9$ are the same as or different from each other, and each independently hydrogen, a $C_{1-30}$ hydrocarbyl group, or a $C_{1-30}$ hydrocarbyloxy group;

Z is —O—, —S—, —$NR_{10}$—, or —$PR_{11}$—;

$R_{10}$ and $R_{11}$ are each independently hydrogen, a $C_{1-20}$ hydrocarbyl group, a $C_{1-20}$ hydrocarbyl(oxy)silyl group, or a $C_{1-20}$ silylhydrocarbyl group;

$M^3$ is Ti, Zr, or Hf;

$X^3$ and $X^4$ are the same as or different from each other, and each independently halogen, a nitro group, an amido group, a phosphine group, a phosphide group, a $C_{1-30}$ hydrocarbyl group, a $C_{1-30}$ hydrocarbyloxy group, a $C_{2-30}$ hydrocarbyloxyhydrocarbyl group, —$SiH_3$, a $C_{1-30}$ hydrocarbyl(oxy)silyl group, a $C_{1-30}$ sulfonate group, or $C_{1-30}$ sulfone group;

T is

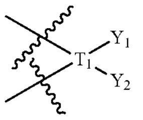

or

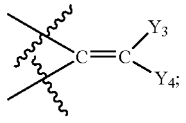

$T_1$ is C, Si, Ge, Sn, or Pb;

$Y_1$ and $Y_3$ are each independently hydrogen, a $C_{1-30}$ hydrocarbyl group, a $C_{1-30}$ hydrocarbyloxy group, a $C_{2-30}$ hydrocarbyloxyhydrocarbyl group, —$SiH_3$, a $C_{1-30}$ hydrocarbyl(oxy)silyl group, a halogen-substituted $C_{1-30}$ hydrocarbyl group, or —$NR_{12}R_{13}$;

$Y_2$ and $Y_4$ are each independently a $C_{2-30}$ hydrocarbyloxyhydrocarbyl group; and $R_{12}$ and $R_{13}$ are the same as or different from each other, and each independently any one of hydrogen and $C_{1-30}$ hydrocarbyl group, or connected with each other to form an aliphatic or aromatic ring.

Further, in Chemical Formulae, "•" represents a site of binding to T.

Meanwhile, unless otherwise specified herein, the following terms may be defined as follows.

The hydrocarbyl group is a monovalent functional group formed by removing a hydrogen atom from hydrocarbon, and may include a $C_{1-30}$ alkyl group, a $C_{2-30}$ alkenyl group, a $C_{2-30}$ alkynyl group, a $C_{6-30}$ aryl group, a $C_{7-30}$ aralkyl group, a $C_{8-30}$ aralkenyl group, a $C_{8-30}$ aralkynyl group, a $C_{7-30}$ alkylaryl group, a $C_{8-30}$ alkenylaryl group, a $C_{8-30}$ alkynylaryl group, etc. In addition, the $C_{1-30}$ hydrocarbyl group may be a $C_{1-20}$ or $C_{1-10}$ hydrocarbyl group. Specifically, the $C_{1-30}$ hydrocarbyl group may be a $C_{1-30}$ linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; a $C_{1-30}$ linear or branched alkenyl group such as vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, etc.; a $C_{2-30}$ linear or branched alkynyl group such as ethynyl, 2-propanyl, etc.; a $C_{6-30}$ aryl group, such as a phenyl group, a naphthyl group, an anthracenyl group, etc.; a $C_{7-30}$ aralkyl group such as a benzyl group, a phenylpropyl group, a phenylhexyl group, etc.; a $C_{7-30}$ alkylaryl group such as a methylphenyl group, an ethylphenyl group, an n-propylphenyl group, an iso-propylphenyl group, an n-butylphenyl group, an iso-butylphenyl group, a tert-butylphenyl group, a cyclohexylphenyl group, etc.

The hydrocarbyloxy group is a functional group formed by binding a hydrocarbyl group to oxygen. Specifically, the $C_{1-30}$ hydrocarbyloxy group may be a $C_{1-20}$ or $C_{1-10}$ hydrocarbyloxy group. More specifically, the $C_{1-30}$ hydrocarbyloxy group may be a $C_{1-30}$ linear, branched, or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexoxy group an n-heptoxy group, a cyclohexoxy group, etc.; or a $C_{6-30}$ aryloxy group such as a phenoxy group, a naphthaleneoxy group, etc.

The hydrocarbyloxyhydrocarbyl group is a functional group formed by substituting one or more hydrogens of a hydrocarbyl group with one or more hydrocarbyloxy groups.

Specifically, the $C_{2-30}$ hydrocarbyloxyhydrocarbyl group may be a $C_{2-20}$ or $C_{2-15}$ hydrocarbyloxyhydrocarbyl group. More specifically, the $C_{2-30}$ hydrocarbyloxyhydrocarbyl group may be a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, a phenoxyhexyl group, etc.

The hydrocarbyl(oxy)silyl group is a functional group formed by substituting one to three hydrogens of —$SiH_3$ with one to three hydrocarbyl or hydrocarbyloxy groups. Specifically, the $C_{1-30}$ hydrocarbyl(oxy)silyl group may be a $C_{1-20}$, $C_{1-15}$, $C_{1-10}$, or $C_{1-5}$ hydrocarbyl(oxy)silyl group. More specifically, the $C_{1-30}$ hydrocarbyl(oxy)silyl group may be a $C_{1-30}$ alkylsilyl group such as a methylsilyl group, a dimethylsilyl group, a trimethylsilyl group, a dimethylethylsilyl group, a diethylmethylsilyl group, a dimethylpropylsilyl group, etc.; a $C_{1-30}$ alkoxysilyl group such as a methoxysilyl group, a dimethoxysilyl group, a trimethoxysilyl group, a dimethoxyethoxysilyl group, etc.; a $C_{2-30}$ alkoxyalkylsilyl group such as a methoxydimethylsilyl group, a diethoxymethylsilyl group, a dimethoxypropylsilyl group, etc.

The silylhydrocarbyl group is a functional group formed by substituting one or more hydrogens of a hydrocarbyl group with a silyl group. The silyl group may be —$SiH_3$ or a hydrocarbyl(oxy)silyl group. Specifically, the $C_{1-20}$ silylhydrocarbyl group may be a $C_{1-15}$ or $C_{1-10}$ silylhydrocarbyl group. More specifically, the $C_{1-20}$ silylhydrocarbyl group may be $—CH_2—SiH_3$, a methylsilylmethyl group, a dimethylethoxysilylpropyl group, etc.

The halogen may be fluorine (F), chlorine (Cl), bromine (Br), or iodine (I).

The sulfonate group may have a structure of $—O—SO_2—R^a$, wherein $R^a$ may be a $C_{1-30}$ hydrocarbyl group. Specifically, the $C_{1-30}$ sulfonate group may be a methanesulfonate group, a phenylsulfonate group, etc.

The sulfone group may have a structure of $—R^{b'}—SO_2—R^{b''}$, wherein $R^{b'}$ and $R^{b''}$ may be the same as or different from each other and may be each independently any one of $C_{1-30}$ hydrocarbyl groups. Specifically, the $C_{1-30}$ sulfone group may be a methylsulfonylmethyl group, a methylsulfonylpropyl group, methylsulfonylbutyl group, a phenylsulfonylpropyl group, etc.

The alkylene group is a divalent functional group formed by removing two hydrogen atoms from alkane. Specifically, the alkylene group may be a $C_{1-20}$, $C_{1-5}$, or $C_{1-3}$ alkylene group. More specifically, the alkylene group may be a methylene group, an ethylene group, a propylene group, a butylene group, or a pentylene group.

As used herein, "two adjacent substituents are connected with each other to form an aliphatic or aromatic ring" means that an atom(s) of two substituents and an atom (atoms) to which the two substituents are bound are connected with each other to form a ring. Specifically, examples in which $R_9$ and $R_{10}$ of $—NR_9R_{10}$ are connected with each other to form an aliphatic ring may include a piperidinyl group, etc., and examples in which $R_9$ and $R_{10}$ of $—NR_9R_{10}$ are connected with each other to form an aromatic ring may include a pyrrolyl group, etc.

Within a range that exhibits the same or similar effect as the desired effect, the above-mentioned substituents may be optionally substituted with one or more substituents selected from the group consisting of a hydroxyl group; a halogen; a hydrocarbyl group; a hydrocarbyloxy group; a hydrocarbyl or hydrocarbyloxy group containing one or more heteroatoms of Group 14 to 16 heteroatoms; $—SiH_3$; a hydrocarbyl (oxy)silyl group; a phosphine group; a phosphide group; a sulfonate group; and a sulfone group.

The $C_{1-20}$ alkyl group may be a linear, branched, or cyclic alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, etc.

The $C_{2-20}$ alkenyl group may be a linear, branched, or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, etc.

The $C_{6-30}$ aryl group may refer to a monocyclic, bicyclic, or tricyclic aromatic hydrocarbon. Specifically, the $C_{6-30}$ aryl group may be a phenyl group, a naphthyl group, an anthracenyl group, etc.

The $C_{7-30}$ alkylaryl group may refer to a substituent formed by substituting one or more hydrogens of aryl with alkyl. Specifically, the $C_{7-30}$ alkylaryl group may be methylphenyl, ethylphenyl, n-propylphenyl, iso-propylphenyl, n-butylphenyl, iso-butylphenyl, tert-butylphenyl, or cyclohexylphenyl, etc.

The $C_{7-30}$ arylalkyl group may refer to a substituent formed by substituting one or more hydrogens of alkyl with aryl. Specifically, the $C_{7-30}$ arylalkyl may be benzyl, phenylpropyl, phenylhexyl, etc.

In the method of preparing the pellet-type polyethylene resin composition, the ethylene/1-hexene copolymer may be prepared by performing a polymerization reaction of an ethylene monomer and a 1-hexene comonomer in the presence of a hybrid supported catalyst including a first transition metal compound including a compound represented by Chemical Formula 1 or a compound represented by Chemical Formula 2; a second transition metal compound represented by Chemical Formula 3; and a carrier.

The first transition metal compound has excellent catalytic activity and is advantageous in the preparation of high-density polyethylene due to its low copolymerizability. In addition, process stability may be improved to prevent a fouling problem which has generally occurred during polymerization of polyethylene.

Specifically, in the first transition metal compound, the compound represented by Chemical Formula 1 is advantageous in the preparation of high-density polyethylene due to its low reactivity to 1-hexene which is a comonomer, and when used together with the second transition metal compound described below, it may easily realize mechanical properties required for pipes, such as high pressure resistance property and long-term heat resistance stability of polyethylene.

More specifically, in Chemical Formula 1, $M^1$ may be zirconium (Zr) or hafnium (Hf), and preferably, Zr.

Further, in Chemical Formula 1, $Cp^1$ and $Cp^2$ may be each independently cyclopentadienyl substituted or unsubstituted with one or more $C_{1-20}$ alkyl groups, and $R^a$ and $R^b$ may be each independently hydrogen, $C_{1-6}$ linear or branched alkyl, $C_{1-6}$ alkyl substituted with $C_{1-6}$ alkoxy, $C_{1-6}$ alkyl substituted with $C_{6-12}$ aryl, or $C_{6-12}$ aryl. For example, $R^a$ and $R^b$ may be each hydrogen, methyl(Me), ethyl(Et), n-propyl(n-Pr), iso-propyl(i-Pr), n-butyl(n-Bu), tert-butyl(t-Bu), n-pentyl(n-Pt), n-hexyl(n-Hex), tert-butoxy(t-Bu-O)hexyl, phenylhexyl, or phenyl(Ph). Among them, $Cp^1$ and $Cp^2$ may be each unsubstituted cyclopentadienyl, and $R^a$ and $R^b$ may be each independently $C_{1-6}$ alkyl substituted with $C_{1-6}$ alkoxy, such as tert-butoxy(t-Bu-O)hexyl.

Further, in Chemical Formula 1, $Z^1$ may be each halogen, more specifically, chlorine.

Further, in Chemical Formula 1, n is 1 or 0.

Further, the first transition metal compound may be represented by any one of the following structural formulae:

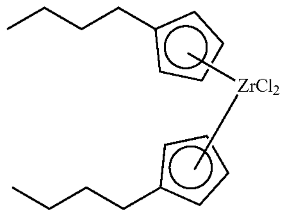

-continued

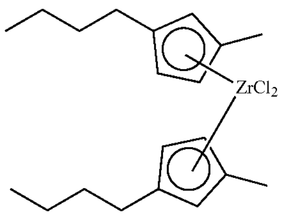

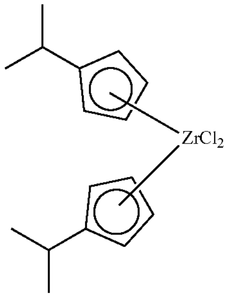

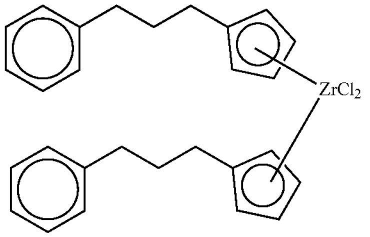

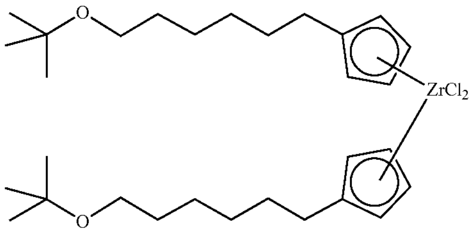

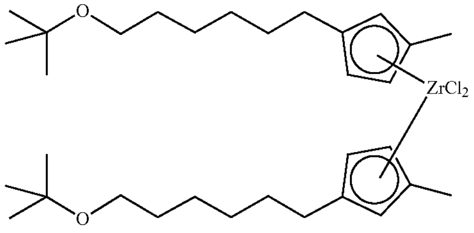

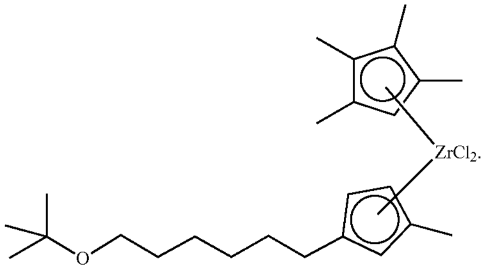

The first transition metal compound represented by the above structural formulae may be synthesized by applying known reactions, and for a more detailed synthesis method, reference may be made to Examples.

Further, in the first transition metal compound, the compound represented by Chemical Formula 2 is also advantageous in the preparation of high-density polyethylene due to its low reactivity to 1-hexene which is a comonomer, and when used together with the second transition metal compound described below, it may easily realize mechanical properties required for pipes, such as high pressure resistance property and long-term heat resistance stability of polyethylene.

More specifically, in Chemical Formula 2, $M^2$ may be Zr or Hf, preferably, Zr.

Further, in Chemical Formula 2, A may be Si.

Further, in Chemical Formula 2, $X^1$ and $X^2$ may be each independently halogen, more specifically, chlorine.

Further, in Chemical Formula 2, $L^1$ and $L^2$ may be each independently $C_{1-6}$ alkylene, more specifically, each independently methylene, ethylene, or propylene.

Further, in Chemical Formula 2, $D^1$ and $D^2$ may be each O.

Further, in Chemical Formula 2, $R^1$ and $R^2$ may be each independently $C_{1-6}$ linear or branched alkyl or $C_{6-12}$ aryl, specifically, methyl(Me), ethyl(Et), n-propyl(n-Pr), iso-propyl(i-Pr), n-butyl(n-Bu), tert-butyl(t-Bu), or phenyl(Ph).

Further, in Chemical Formula 2, $R^3$ and $R^4$ ma be each independently linear or branched $C_{1-6}$ alkyl, and more specifically, $R^3$ and $R^4$ may be each independently methyl(Me), ethyl(Et), n-propyl(n-Pr), n-butyl(n-Bu), n-pentyl(n-Pt), or n-hexyl(n-Hex). Further, $R^3$ and $R^4$ may be the same as each other.

Specifically, the compound represented by Chemical Formula 2 may be represented by any one of the following structural formulae:

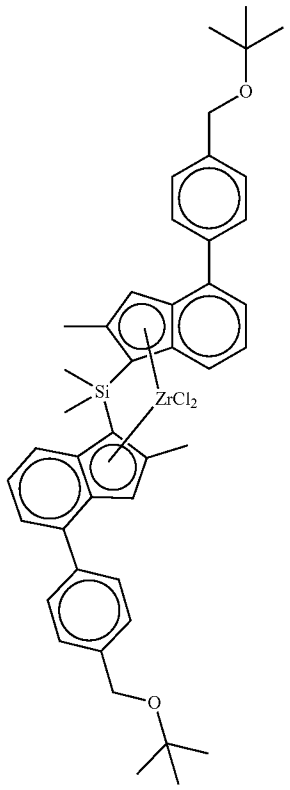

-continued
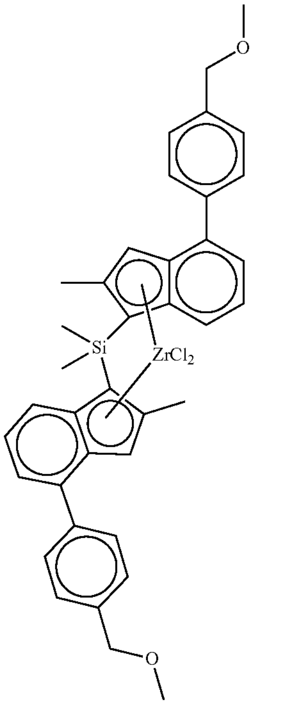
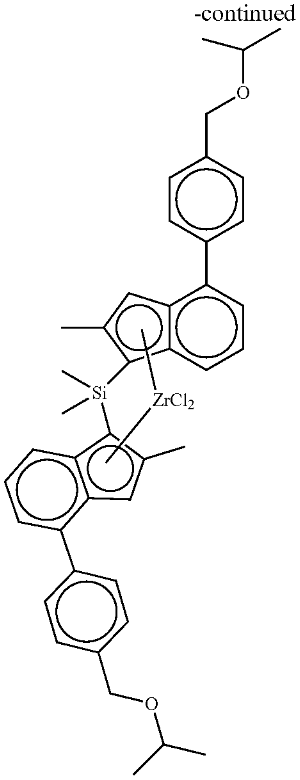
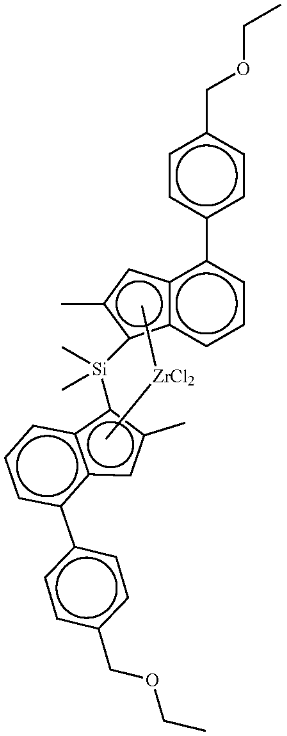
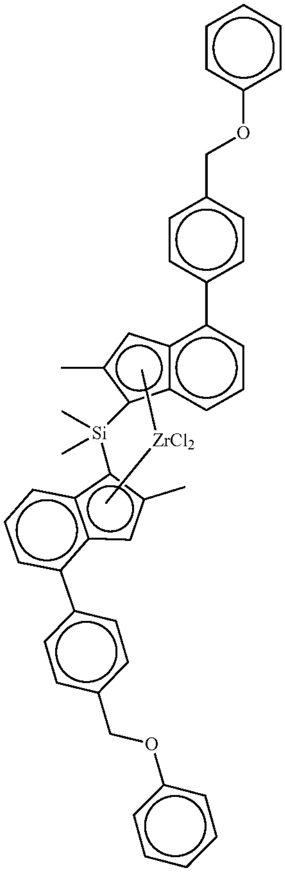

-continued
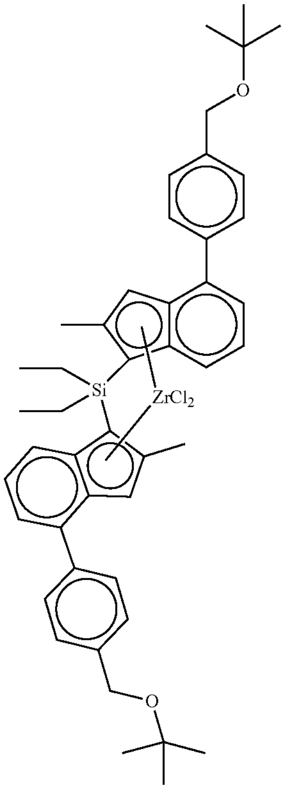
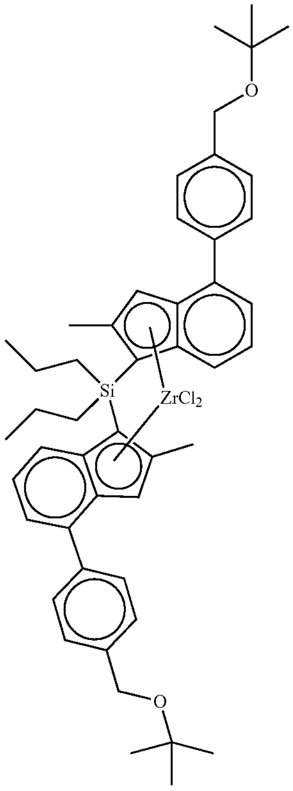
-continued
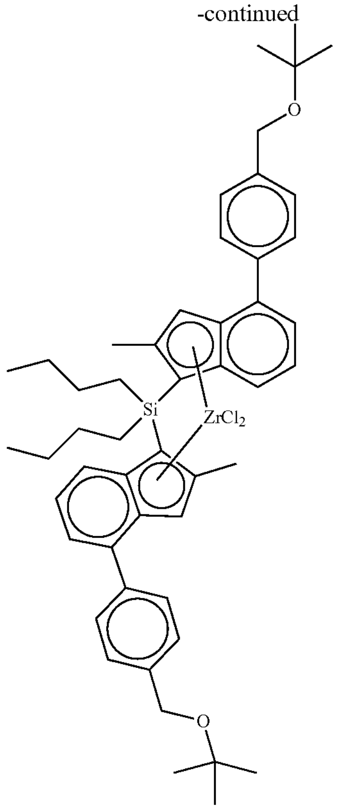
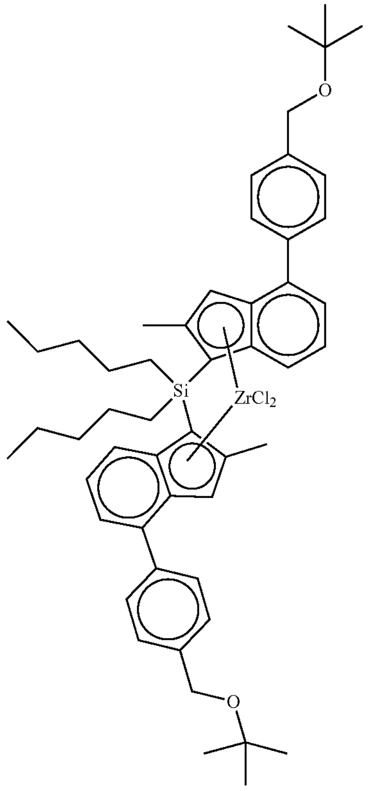

-continued

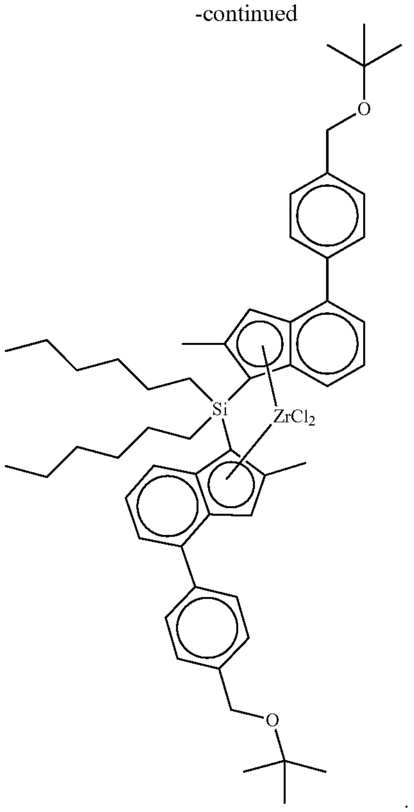

The compounds represented by the above structural formulae may be synthesized by applying known reactions, and for a more detailed synthesis method, reference may be made to Examples.

Meanwhile, in the second transition metal compound, the compound represented by Chemical Formula 3 has a structure in which an aromatic ring compound containing thiophene and a base compound containing a Group 14 or 15 element are included as different ligands, which are crosslinked by -T-, and $M(X^3)(X^4)$ exists between the different ligands. Due to this structural feature, the compound may exhibit high activity during the polymerization reaction of the ethylene polymer. Further, the compound represented by Chemical Formula 3 has high reactivity to the 1-hexene comonomer to promote formation of tie molecules by the comonomer and to increase entanglement during crystal formation, thereby realizing physical properties that increase long-term heat resistance stability.

More specifically, the $Cp^3$ ligand in the structure of the transition metal compound represented by Chemical Formula 3 may influence, for example, ethylene polymerization activity and polymerization properties. In particular, the transition metal compound represented by Chemical Formula 3 exhibits very high catalytic activity in an olefin polymerization process, the transition metal compound represented by Chemical Formula 3 including, as the $Cp^3$ ligand, a ligand, in which in Chemical Formulae 4a to 4d, $R_1$ to $R_4$, $R_8$ and $R_9$ are each independently hydrogen or a $C_{1-10}$ hydrocarbyl group, and more specifically, each independently hydrogen or $C_{1-10}$ alkyl, $R_5$ to $R_7$ are each independently a $C_{1-10}$ hydrocarbyl group, and more specifically, each independently a $C_{1-10}$ alkyl, and much more specifically, in Chemical Formulae 4a to 4d, $R_1$ to $R_4$, $R_8$ and $R_9$ are each independently hydrogen or methyl, and $R_5$ to $R_7$ are each methyl.

Further, in the transition metal compound represented by Chemical Formula 3, the Z ligand may influence, for example, olefin polymerization activity. In particular, when Z of Chemical Formula 3 is $—NR_{10}—$, wherein $R_{10}$ is a $C_{1-10}$ hydrocarbyl group, more specifically, $C_{1-10}$ alkyl, and much more specifically, $C_{3-6}$ branched alkyl such as t-butyl, it is possible to provide a catalyst exhibiting very high activity in the olefin polymerization process.

The $Cp^3$ ligand and the Z ligand may be crosslinked by -T- to exhibit excellent supporting stability and polymerization activity. For this effect, -T- may have a structure of

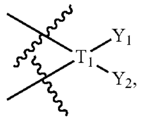

wherein $T_1$ may be C or Si, $Y_1$ may be any one of a $C_{1-30}$ hydrocarbyl group and a $C_{1-30}$ hydrocarbyloxy group, and $Y_2$ may be any one of $C_{2-30}$ hydrocarbyloxyhydrocarbyl groups. Specifically, $T_1$ may be Si, $Y_1$ may be $C_{1-20}$ or $C_{1-10}$ alkyl, $Y_2$ may be $C_{2-20}$ or $C_{2-10}$ alkoxyalkyl, or $C_{7-20}$ or $C_{7-14}$ aryloxyalkyl, and more specifically, $Y_1$ may be any one of a methyl group, an ethyl group, an n-propyl group, and an n-butyl group, and $Y_2$ may be any one of a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, and a phenoxyhexyl group.

Meanwhile, $M(X^3)(X^4)$ exists between the crosslinked $Cp^3$ ligand and Z ligand, and $M(X^3)(X^4)$ may influence storage stability of the metal complex. To more effectively ensure this effect, a transition metal compound, in which $X^3$ and $X^4$ may be each independently halogen, more specifically, chlorine, may be used.

The compound of Chemical Formula 3 may be exemplified by compounds represented by the following Chemical Formulae 5 to 8:

[Chemical Formula 5]

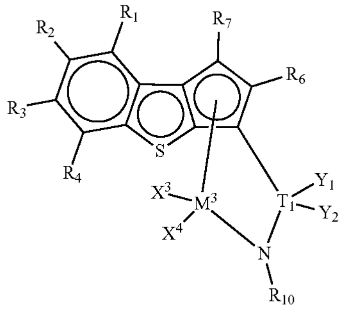

[Chemical Formula 6]

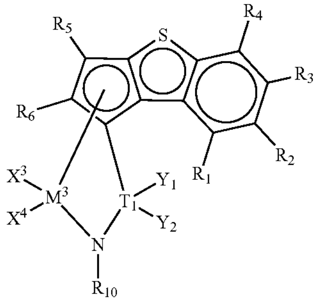

-continued

[Chemical Formula 7]

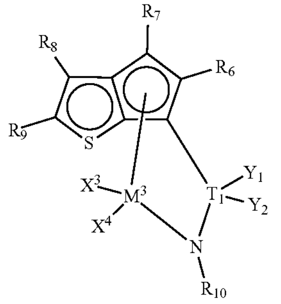

[Chemical Formula 8]

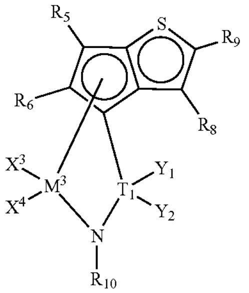

in Chemical Formulae 5 to 8, $R_1$ to $R_{10}$, $M^3$, $X^3$, $X^4$, $T_1$, $Y_1$ and $Y_2$ are the same as defined above.

Specifically, in Chemical Formulae 5 to 8, $R_1$ to $R_4$, $R_8$ and $R_9$ may be the same as or different from each other, and each independently hydrogen or a $C_{1-10}$ hydrocarbyl group, more specifically, each independently hydrogen or $C_{1-10}$ alkyl, $R_8$ to $R_7$ may be the same as or different from each other, and each independently a $C_{1-10}$ hydrocarbyl group, more specifically, $C_{1-10}$ alkyl, $R_{10}$ may be a $C_{1-10}$ hydrocarbyl group, more specifically, $C_{1-10}$ alkyl, $M^3$ may be $T_1$, Zr, or Hf, more specifically $T_1$, $X^3$ and $X^4$ may be the same as or different from each other, and each independently halogen, more specifically, chlorine, $T_1$ may be C or Si, more specifically Si, $Y_1$ may be a $C_{1-30}$ hydrocarbyl group or a $C_{1-30}$ hydrocarbyloxy group, more specifically $C_{1-20}$ or $C_{1-10}$ alkyl, $Y_2$ may be a $C_{2-30}$ hydrocarbyloxyhydrocarbyl group, more specifically, a $C_{2-20}$ or $C_{2-10}$ alkoxyalkyl group, or a $C_{7-20}$ or $C_{7-14}$ aryloxyalkyl group.

Much more specifically, the compound represented by Chemical Formula 3 may have the following structures:

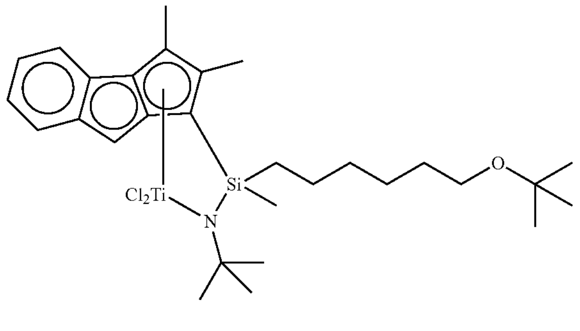

-continued

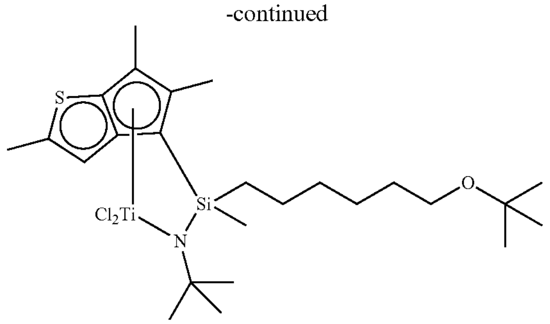

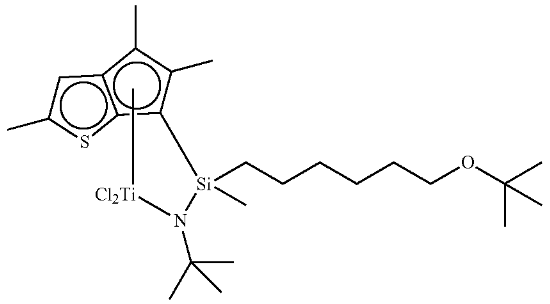

The transition metal compound represented by Chemical Formula 3 may be synthesized by applying known reactions, and for a more detailed synthesis method, reference may be made to Examples.

Meanwhile, in the present invention, the first and second transition metal compounds may be each a meso isomer, a racemic isomer, or a mixture thereof.

As used herein, the "racemic form" or "racemate" or "racemic isomer" means that the same substituents on the two cyclopentadienyl moieties exist on the opposite side with respect to the plane including the transition metals represented by $M^1$ to $M^3$ in Chemical Formulae 1 to 3, for example, zirconium (Zr) or hafnium (Hf) and the center of the cyclopentadienyl moieties.

Further, as used herein, the term "meso form" or "meso isomer", which is a stereoisomer of the above-described racemic isomer, means that the same substituents on the two cyclopentadienyl moieties exist on the same side with respect to the plane including the transition metals represented by $M^1$ to $M^3$ in Chemical Formulae 1 to 3, for example, zirconium (Zr) or hafnium (Hf) and the center of the cyclopentadienyl moieties.

The first and second transition metal compounds may be used at a molar ratio of 1:0.5 to 1:1.4. When they are used at the above-described mixing molar ratio, it is possible to exhibit excellent supporting performance and catalytic activity and to realize the above-described physical properties of the pellet-type polyethylene resin composition.

When the mixing molar ratio of the first transition metal compound and the second transition metal compound is more than 1:1.4, and thus the content of the second transition metal compound is too high, it is difficult to realize the above-described physical properties of the pellet-type polyethylene resin composition because only the second transition metal compound acts predominantly. On the contrary, when the mixing molar ratio thereof is less than 1:0.5, and thus the content of the second transition metal compound is too low, it is difficult to reproduce the desired molecular structure of the polymer because only the first transition metal compound acts predominantly. More specifically, the first transition metal compound and the second transition metal compound may be mixed at a molar ratio of 1:0.5 or more, and 1:1 or less, or 1:0.7 or less.

Meanwhile, the first and second transition metal compounds may be used in the state of a supported catalyst that is supported on a silica carrier.

When used in the state of the supported catalyst, the prepared polymer may have excellent particle shape and bulk density, and the catalyst may be appropriately used for the common slurry polymerization, bulk polymerization, or gas phase polymerization process. Among various carriers, the silica carrier is supported by chemically binding with the functional group of the transition metal compound, and therefore, catalysts are hardly released from the carrier surface during an ethylene polymerization process, and as a result, when preparing polyethylene by slurry or gas phase polymerization, fouling, in which polymer particles are adhered to the wall surface of a reactor or to each other, may be minimized.

The silica carrier may have a median particle diameter (D50) of 20 μm to 40 km. When having the above-mentioned particle size, the transition metal compound may be supported with higher efficiency, and as a result, catalytic activity may be increased. More specifically, its diameter may be 20 μm or more, or 25 μm or more, and 40 μm or less, or 30 μm or less.

Meanwhile, in the present invention, the median particle diameter (D50) of the silica carrier refers to a particle diameter at 50% in the cumulative distribution according to particle size (particle diameter). D50 may be measured using a laser diffraction method. Specifically, the silica carrier to be measured is dispersed in a dispersion medium such as deionized water, etc., and introduced into a commercially available laser diffraction particle size analyzer (e.g., Microtrac S3500) to measure a diffraction pattern difference according to the particle size when particles pass through the laser beam, thereby calculating the particle size distribution. The particle size at 50% in the cumulative distribution according to the particle size in the analyzer is determined, and taken as the median particle diameter.

Further, when supported on the silica carrier, the first and second transition metal compounds may be supported in an amount of 0.04 mmol or more, or 0.05 mmol or more, and 0.1 mmol or less, or 0.08 mmol or less, or 0.06 mmol or less, based on 1000 g of the silica, respectively. When they are supported in the above content range, appropriate activity of the supported catalyst may be obtained, which may be advantageous in terms of maintaining catalytic activity and economic efficiency.

The cocatalyst may include one or more selected from a compound represented by the following Chemical Formula 9, a compound represented by the following Chemical Formula 10, and a compound represented by the following Chemical Formula 11:

$$-[Al(R_{11})-O]_m- \quad \text{[Chemical Formula 9]}$$

in Chemical Formula 9, $R_{11}$ may be the same as or different from each other, and each independently halogen; a $C_{1-20}$ hydrocarbyl group; or a halogen-substituted $C_{1-20}$ hydrocarbyl group;

m may be an integer of 2 or more;

$$J(R_{12})_3 \quad \text{[Chemical Formula 10]}$$

in Chemical Formula 10, $R_{12}$ may be the same as or different from each other, and each independently halogen; a $C_{1-20}$ hydrocarbyl group; or a halogen-substituted $C_{1-20}$ hydrocarbyl group;

J may be aluminum or boron;

$$[E\text{-}H]^+[QD_4]^- \text{ or } [E]^+[QD_4]^- \quad \text{[Chemical Formula 11]}$$

in Chemical Formula 11,

E is a neutral or cationic Lewis base;

H is a hydrogen atom;

Z is a Group 13 element;

D may be the same as or different from each other, and each independently, a $C_{6-20}$ aryl or $C_{1-20}$ alkyl group, of which one or more hydrogen atoms are substituted or unsubstituted with halogen, a $C_{1-20}$ hydrocarbyl group, alkoxy, or phenoxy.

Examples of the compound represented by Chemical Formula 9 may include alkylaluminoxane-based compounds, such as methylaluminoxane, ethylaluminoxane, isobutylaluminoxane or butylaluminoxane, etc., and any one thereof or a mixture of two or more thereof may be used.

Further, examples of the compound represented by Chemical Formula 10 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tollylaluminum, dimethylaluminummethoxide, dimethylaluminumethoxide, trimethylboron, triethylboron, triisobutylboron, tripropylboron, tributylboron, etc., and any one thereof or a mixture of two or more thereof may be used.

Further, examples of the compound represented by Chemical Formula 11 may include triethylammonium tetraphenylboron, tributylammonium tetraphenylboron, trimethylammonium tetraphenylboron, tripropylammonium tetraphenylboron, trimethylammonium tetra(p-tollyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tollyl)aluminum, tripropylammonium tetra(p-tollyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tollyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, etc., and any one thereof or a mixture of two or more thereof may be used.

Among the above-described compounds, the cocatalyst may be more specifically an alkylaluminoxane-based cocatalyst such as methylaluminoxane.

Since the alkylaluminoxane-based cocatalyst includes a metal element that stabilizes the first and second transition metal compounds, also acts as a Lewis acid, and forms a bond through Lewis acid-base interaction with the functional group introduced in the bridge group of the first and second transition metal compounds, it may further increase catalytic activity.

Further, the content of the cocatalyst used may be appropriately controlled according to the aimed physical properties or effects of the catalyst and pellet-type polyethylene resin composition. For example, when silica is used as the carrier, the cocatalyst may be supported in an amount of 8 mol or more, or 10 mol or more, and 20 mol or less, or 15 mol or less, based on the weight of the carrier, e.g., 1000 g of silica.

The catalyst composition having the above construction may be prepared by a preparation method including the steps of supporting a cocatalyst compound on a carrier, and supporting the first and second transition metal compounds on the carrier, wherein the supporting sequence of the cocatalyst and the first and second transition metal compounds may vary. The supporting sequence of the first and second transition metal compounds may also vary, as needed. The first and second transition metal compounds may be supported at the same time. Considering the effect of a supported catalyst having a structure determined according to the supporting sequence, the cocatalyst may be supported on the carrier, and then the second and first transition metal compounds may be sequentially supported, so as to realize high catalytic activity and more excellent process stability in a process of preparing polyethylene by the prepared supported catalyst.

Meanwhile, the ethylene/1-hexene copolymer may be prepared by a polymerization process of contacting the catalyst composition including the transition metal compound of Chemical Formula 1 with ethylene monomer and 1-hexene comonomer in the presence or absence of hydrogen gas.

In this regard, the input amounts of the ethylene monomer and 1-hexene comonomer may be determined according to physical properties of the copolymer to be prepared. Specifically, when the pellet-type polyethylene resin composition satisfying the above-described range of density is prepared, the 1-hexene copolymer may be introduced in an amount of 0.75 parts by weight or more, or 0.9 parts by weight or more, and 10 parts by weight or less, or 5 parts by weight or less, or 3 parts by weight or less, based on 100 parts by weight of the ethylene monomer. When the input amount of the 1-hexene comonomer is less than 0.75 parts by weight or more than 10 parts by weight, the density of the pellet-type polyethylene resin composition to be prepared becomes too high or low outside the above optimal range, and as a result, water pressure resistance property may decrease or dimensional stability may decrease.

Further, in the polymerization reaction, hydrogen gas performs a function of activating non-active site of the metallocene catalyst and causing a chain transfer reaction, thereby controlling the molecular weight. The first and second transition metal compounds used in the present invention have excellent hydrogen reactivity, and therefore, polyethylene having desired molecular weight and melt index may be effectively obtained by controlling the amount of the hydrogen gas during the polymerization process.

When the hydrogen gas is introduced, it may be introduced in an amount of 120 ppm or more, or 150 ppm or more, or 170 ppm or more, and 2500 ppm or less, or 1000 ppm or less, or 900 ppm or less, based on the total weight of the monomers, i.e., the total weight of the ethylene monomer and the 1-hexene comonomer.

Further, the polymerization reaction of the ethylene/1-hexene copolymer may be conducted by a continuous polymerization process. For example, various polymerization processes known as a polymerization reaction of olefin monomers, such as a solution polymerization process, a slurry polymerization process, a suspension polymerization process, or an emulsion polymerization process, etc. may be employed. Particularly, in order to realize a narrow molecular weight distribution and high flowability of the prepared ethylene/1-hexene copolymer, while considering the commercial production of the product, a continuous bulk slurry polymerization process may be employed, wherein a catalyst, monomers, and optionally, hydrogen gas are continuously introduced.

Further, the polymerization reaction may be performed at a temperature of 40° C. or higher, or 60° C. or higher, or 70° C. or higher, and 110° C. or lower or 100° C. or lower, and a pressure of 1 $kgf/cm^2$ or more, or 5 $kgf/cm^2$ or more, and 100 $kgf/cm^2$ or less, or 50 $kgf/cm^2$ or less. When the polymerization is performed under this temperature and pressure, the desired ethylene/1-hexene copolymer may be prepared with high yield.

Further, during the polymerization reaction, trialkylaluminum such as triethylaluminum may be, optionally, further introduced in an amount of 0.01% by weight or more, or 0.05% by weight or more, or 0.1% by weight or more, and 1% by weight or less, or 0.5% by weight or less, based on the total weight of the ethylene monomer and the 1-hexene comonomer. When moisture or impurities exist in a polymerization reactor, a part of catalyst may be decomposed. Since the trialkylaluminum functions of previously scavenging moisture or impurities existing in the reactor, it may maximize the activity of a catalyst used in the preparation, and as a result, it is possible to prepare the ethylene/1-hexene copolymer satisfying the above-described physical property requirements with higher yield.

The ethylene/1-hexene copolymer prepared by the above-described polymerization process exhibits a low melt index and a high density. Therefore, when the pellet-type polyethylene resin composition is prepared, processability and dimensional stability may be improved.

Next, the ethylene/1-hexene copolymer prepared as above may be used to prepare a resin composition for preparing a pellet-type polyethylene resin composition, which is then extruded to prepare the pellet-type polyethylene resin composition.

The resin composition for preparing the pellet-type polyethylene resin composition according to one embodiment of the present invention may include the ethylene/1-hexene copolymer, and optionally, may further include an antioxidant.

The antioxidant may specifically include an organometallic antioxidant such as calcium stearate, aluminum para-tert butyl benzoate, sodium benzoate, calcium benzoate, etc.; a phenolic antioxidant such as 1,3,5-trimethyl-2,4,6-tris(3,5-di-t-butyl-4-hydroxybenzyl)benzene, pentaerythritol tetrakis(3-(3,5-di-t-butyl-4-hydroxyphenyl)propionate) (Irganox 1010®, BASF Corporation), etc., and more specifically, a hindered phenolic antioxidant, and any one thereof or a mixture of two or more thereof may be used.

Among common antioxidants, the organometallic compound has excellent antioxidant property, and when used in combination with the ethylene/1-hexene copolymer, it may prevent decomposition by oxygen in the air or heat with high efficiency, thereby further improving processability.

Further, the phenolic antioxidant has excellent property of preventing decomposition by heat, as compared with common antioxidants such as a phosphorus-based antioxidant. Further, in the powder-type resin composition in the prior art, instead of pellet type, an antioxidant was added to the ethylene/1-hexene copolymer in the form of powder, and thus uniformity of antioxidant distribution was deteriorated, and it was difficult to distribute the antioxidant inside the powder, thus deteriorating the effect. In contrast, in the present invention, the above-described phenolic antioxidant is used in combination with the above-described ethylene/1-hexene copolymer, and therefore, the antioxidant may be uniformly dispersed in the pellet-type resin composition, thereby exhibiting more excellent effect of preventing thermal decomposition and improving processability.

More specifically, as the antioxidant, the above-described organometallic compound and phenolic antioxidant may be used in combination, thereby further improving processability.

In this case, the organometallic compound may be used in an amount of 0.01% by weight to 1% by weight, based on the total weight of the resin composition including the ethylene/1-hexene copolymer for preparing the pellet-type polyethylene resin composition, and more specifically, it may be used in an amount of 0.01% by weight or more, or 0.1% by weight or more, or 0.2% by weight or more, and 0.5% by weight or less, or 0.3% by weight or less, based on the total weight of the resin composition.

In addition, the phenolic antioxidant may be used in an amount of 0.01% by weight to 1% by weight, more specifically, in an amount of 0.1% by weight or more, or 0.2% by weight or more, or 0.3% by weight or more, and 1% by weight or less, or 0.5% by weight or less, or 0.45% by weight or less, or 0.4% by weight or less, based on the total weight of the resin composition including the ethylene/1-hexene copolymer.

Further, the organometallic compound and the phenolic antioxidant may be used at a weight ratio of 1:1 to 1:2, more specifically, at a weight ratio of 1:1 or more, or 1:1.3 or more, or 1.4 or more, and 1:2 or less, or 1:1.5 or less under conditions satisfying the above-described each content range. With regard to the above weight ratio, "or more" and "or less" are based on the amount of the phenolic antioxidant used.

Within the above ranges of the content and the mixing weight ratio, processability of the pellet-type polyethylene resin composition may be further improved.

Further, the resin composition including the ethylene/1-hexene copolymer for preparing the pellet-type polyethylene resin composition may further include one or more additives such as a neutralizing agent, a slip agent, an anti-blocking agent, a UV stabilizer, an antistatic agent, etc., in addition to the ethylene/1-hexene copolymer, the organimetallic compound, and the phenolic antioxidant. The amount of the additives is not particularly limited. For example, it may be used respectively in an amount of 500 ppm or more, or 700 ppm or more, and 2500 ppm or less, or 1500 ppm or less, based on the total weight of ethylene/1-hexene copolymer.

Next, the resin composition including the ethylene/1-hexene copolymer is subjected to an extrusion process to prepare a pellet-type polyethylene resin composition.

The extrusion process may be conducted by a common method, except that a pellet die temperature is controlled to a range of 150° C. to 190° C.

Specifically, the extrusion process may be conducted using a common extruder, wherein the temperature and speed of the extruder barrel are not specifically limited, but for example, it may be conducted under conditions of 50° C. to 250° C. and 100 rpm to 1000 rpm.

Further, during the extrusion, the pellet die temperature decreases a temperature of a molten resin, thereby increasing viscosity and enabling pelletization. When the pellet die temperature is lower than 150° C., the ethylene/1-hexene copolymer may not be sufficiently molten, and therefore, pelletization may not be sufficiently achieved, or it may be solidified to block the inside of a die, thereby deteriorating productivity. Further, when the pellet die temperature is higher than 190° C., viscosity may become excessively low, and the ethylene/1-hexene copolymer may flow like fluid, and therefore, it is difficult to prepare a pellet, such as difficulty in cutting into a pellet shape. More specifically, the pellet die temperature may be 155° C. or higher, or 160° C. or higher, and 180° C. or lower, or 170° C. or lower.

Further, when a pressure as well as the pellet die temperature is controlled, the pellet die pressure may be 20 bar or more, or 30 bar or more, and 50 bar or less, or 35 bar or less. When the pressure is controlled within the above range, the shape and physical properties of the pellet-type polyethylene resin composition may be more easily realized.

The pellet-type polyethylene resin composition prepared by the above method may include the ethylene/1-hexene copolymer, and optionally, antioxidants, and may exhibit the above-described physical properties, thereby exhibiting excellent water pressure resistance property, dimensional stability, and processability. Therefore, it is particularly useful for the manufacture of pipes, especially, large-diameter pipes, PE-RT pipes.

Accordingly, according to still another embodiment of the present invention, provided is a pipe manufactured by using the above-described pellet-type polyethylene resin composition.

Meanwhile, the type and content of the ethylene/1-hexene copolymer and the antioxidants in the pellet-type polyethylene resin composition are the same as described above.

Hereinafter, preferred exemplary embodiments will be provided for better understanding of the present invention. However, the following exemplary embodiments are provided only for illustrating the present invention more easily, but the content of the present invention is not limited thereby.

Preparation of Catalyst

Preparation Example 1

First, silica (SP952 produced by Grace Davison, a median particle diameter (D50) of 28 μm) was dehydrated and dried under vacuum at 250° C. for 12 hours to prepare a carrier.

3.0 kg of a toluene solution was put in a 20 L-capacity stainless steel (sus) autoclave reactor, to which 1000 g of the silica previously prepared was added and sufficiently dispersed by stirring for 60 minutes while raising the reactor temperature to 40° C. Then, 6.5 kg of a 10 wt % methyl aluminoxane (MAO)/toluene solution was introduced, and the mixture was stirred at 200 rpm for 12 hours. After raising the reactor temperature to 60° C., a solution of 0.059 mmol of a first transition metal compound (1a) having the following structure dissolved in toluene was added and then reacted for 2 hours at 50° C. under stirring at 200 rpm.

After completing the reaction, a solution of 0.059 mmol of a second transition metal compound (3a) having the following structure in toluene was added to the reaction solution, and reacted for 2 hours at 50° C. under stirring at 200 rpm.

After completing the reaction, the stirring was stopped, settling was carried out for 30 minutes, and then the reaction solution was subjected to decantation. Thereafter, washing was carried out with a sufficient amount of toluene, and then 3.0 kg of toluene was added, followed by stirring for 30 minutes. Then, the stirring was stopped, and washing was carried out with a sufficient amount of toluene to remove compounds which did not participate in the reaction. Thereafter, 3.0 kg of hexane was put in the reactor, followed by stirring. This hexane slurry was transferred to a filter to be filtered.

First drying was carried out at room temperature under reduced pressure for 5 hours, and then second drying was carried out at 50° C. for 4 hours under reduced pressure to obtain a hybrid supported catalyst. A molar ratio of first transition metal compound (1a):second transition metal compound (3a) in the hybrid supported catalyst was 1:1.

(1a)

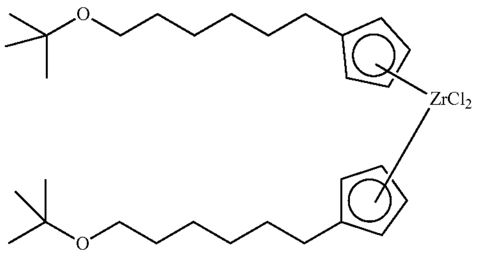

(3a)

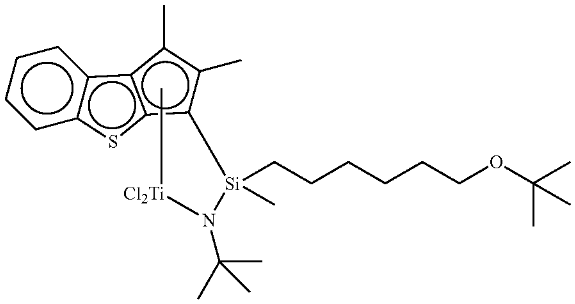

Preparation Example 2

A catalyst was prepared in the same manner as in Preparation Example 1, except that a compound (2a) having the following structure was used as the first transition metal compound, and a mixing ratio of first transition metal compound(2a):second transition metal compound(3a) was changed to a molar ratio of 1:0.7 in Preparation Example 1.

(2a)

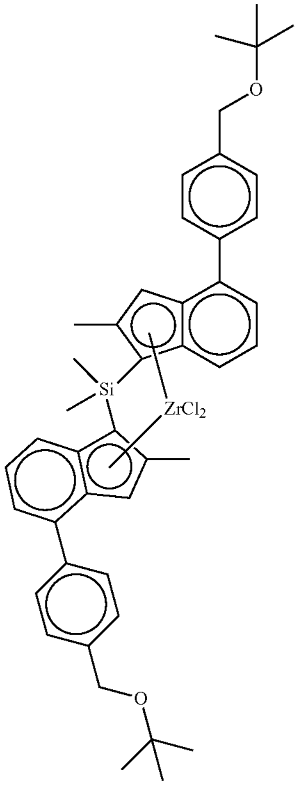

(3a)

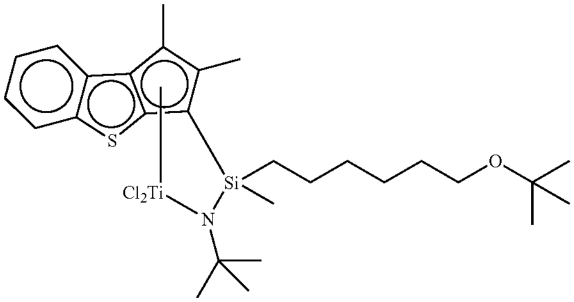

Preparation Example 3

A catalyst was prepared in the same manner as in Preparation Example 1, except that a mixing ratio of first transition metal compound(1a):second transition metal compound (3a) was changed to a molar ratio of 1:1.20 in Preparation Example 1.

Preparation Example 4

A catalyst was prepared in the same manner as in Preparation Example 1, except that a mixing ratio of first transition metal compound(1a):second transition metal compound (3a) was changed to a molar ratio of 1:1.30 in Preparation Example 1.

Comparative Preparation Example 1

A catalyst was prepared in the same manner as in Preparation Example 2, except that a mixing ratio of first transition metal compound(2a):second transition metal compound (3a) was changed to a molar ratio of 1:1.43.

Comparative Preparation Example 2

A catalyst was prepared in the same manner as in Preparation Example 2, except that a compound having the following Chemical Formula I was used as the first transition metal compound and a compound having the following Chemical Formula II was used as the second transition metal compound, and a mixing ratio of first transition metal compound(I):second transition metal compound(II) was changed to a molar ratio of 1:1.25.

(I)

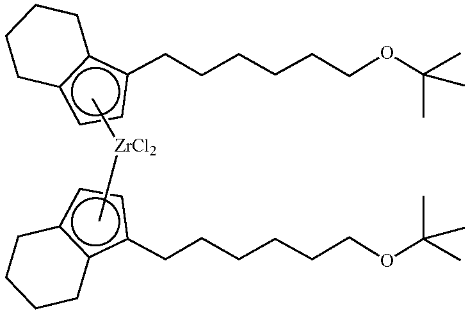

(II)

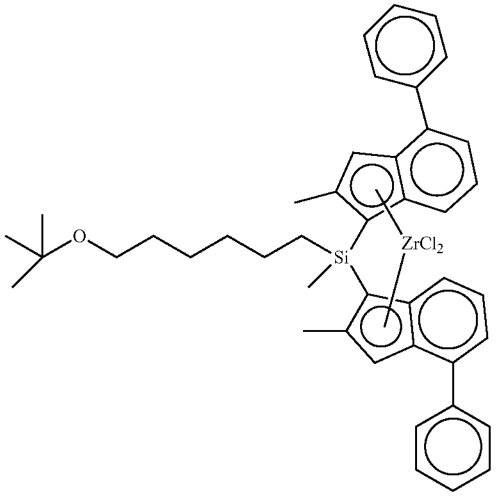

Comparative Preparation Example 3

A catalyst was prepared in the same manner as in Preparation Example 2, except that a mixing ratio of first transition metal compound(2a):second transition metal compound (3a) was changed to a molar ratio of 1:2.

Comparative Preparation Example 4

A catalyst was prepared in the same manner as in Preparation Example 2, except that a compound having the following Chemical Formula III was used as the second transition metal compound, and a mixing ratio of first transition metal compound(1a):second transition metal compound(III) was changed to a molar ratio of 1:1.3.

(III)

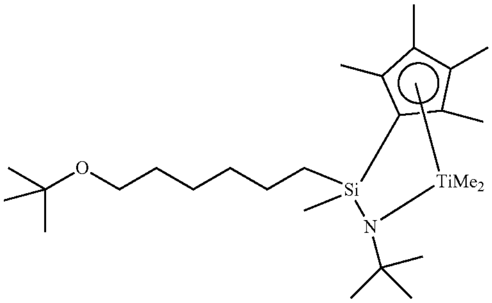

Comparative Preparation Example 5

A catalyst was prepared in the same manner as in Preparation Example 1, except that a compound having the following Chemical Formula IV was used as the second transition metal compound, and a mixing ratio of first transition metal compound(1a):second transition metal compound(IV) was changed to a molar ratio of 1:4.

(IV)

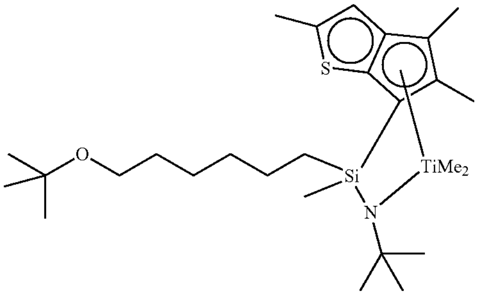

Comparative Preparation Example 6

A catalyst was prepared in the same manner as in Preparation Example 1, except that a compound (I) having the following structure was used as the first transition metal compound and a compound (3a) having the following structure was used as the second transition metal compound, and a mixing ratio of first transition metal compound(I):second transition metal compound(3a) was changed to a molar ratio of 1:0.75.

(I)

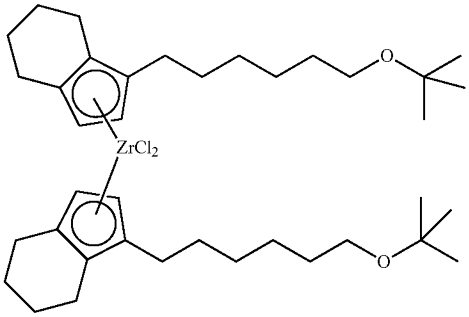

-continued (3a)

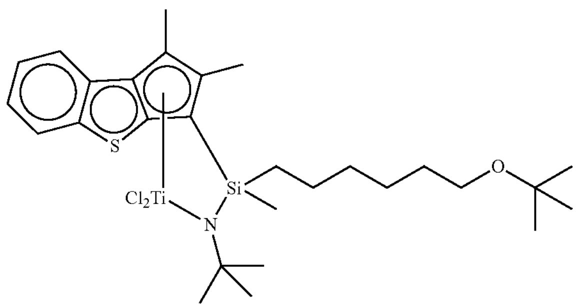

Comparative Preparation Example 7

A catalyst was prepared in the same manner as in Preparation Example 1, except that a mixing ratio of first transition metal compound(1a):second transition metal compound (3a) was changed to a molar ratio of 2.1:1.0 in Preparation Example 1.

Example 1

Step 1: Preparation of Ethylene/1-Hexene Copolymer

Bulk-slurry polymerization of ethylene was carried out using a loop reactor in the presence of the hybrid supported catalyst prepared in Preparation Example 1.

In detail, 33 kg/hr of ethylene was introduced into the loop reactor, and hydrogen gas and 1-hexene as a comonomer were introduced using a pump, respectively. 4% by weight of the hybrid supported catalyst prepared in Preparation Example 1 was dispersed in iso-butane, and 2 ml/min thereof was introduced. At this time, 0.3 kg/hr of 1-hexene was introduced, and the hydrogen gas was introduced in an amount of 170 ppm, based on the total weight of the monomers including ethylene and 1-hexene. An ethylene/1-hexene copolymer was prepared while maintaining the reactor at 93° C. and productivity of 33 kg per hour.

Step 2: Preparation of Pellet-Type Polyethylene Resin Composition

The ethylene/1-hexene copolymer prepared above, calcium stearate as an organometallic compound, and Irganox 1010® (produced by BASF Corporation) as a phenolic antioxidant were mixed to prepare a resin composition, which was then extruded using a twin screw extruder under the following conditions to prepare a pellet-type polyethylene resin composition (a mean diameter of pellet: 4 mm). At this time, the organometallic compound and the phenolic antioxidant were introduced in an amount of about 0.25% by weight and about 0.35% by weight, respectively, based on the total weight of the resin composition.

<Extrusion Conditions>

Screw speed: 150 rpm

Feed rate: 20 kg/hr

Extruder barrel temperature: sequentially control 50° C.→100° C.→150° C.→250° C.→200° C.→150° C.

Pellet die temperature: 160° C.

Pellet die pressure: 30 bar

Example 2

An ethylene/1-hexene copolymer and a pellet-type polyethylene resin composition (a mean diameter of pellet: 4 mm) were prepared in the same manner as in Example 1, except that the hybrid supported catalyst prepared in Preparation Example 2 was used.

Example 3

An ethylene/1-hexene copolymer and a pellet-type polyethylene resin composition (a mean diameter of pellet: 4 mm) were prepared in the same manner as in Example 1, except that the hybrid supported catalyst prepared in Preparation Example 3 was used.

Example 4

An ethylene/1-hexene copolymer and a pellet-type polyethylene resin composition (a mean diameter of pellet: 4 mm) were prepared in the same manner as in Example 1, except that the hybrid supported catalyst prepared in Preparation Example 4 was used.

Comparative Example 1

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 1 was used.

Comparative Example 2

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 1 was used, and the input amount of hydrogen was increased from 170 ppm to 210 ppm, based on the total weight of the monomers during the polymerization process.

Comparative Example 3

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 2 was used.

Comparative Example 4

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 3 was used.

Comparative Example 5

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 4 was used.

Comparative Example 6

A pellet-type polyethylene resin composition (a mean diameter of pellet: 4 mm) was prepared in the same manner as in Example 1, except that XP9020® (produced by DAELIM) which is an ethylene/1-hexene copolymer prepared using a metallocene catalyst was used.

Comparative Example 7

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 5 was used.

Comparative Example 8

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 6 was used.

Comparative Example 9

An ethylene/1-hexene copolymer and a polyethylene resin composition were prepared in the same manner as in Example 1, except that the extrusion process of preparing the pellet-type resin composition was not performed.

Comparative Example 10

An ethylene/1-hexene copolymer and a pellet-type polyethylene resin composition (a mean diameter of pellet: 4 mm) were prepared in the same manner as in Example 1, except that the hybrid supported catalyst prepared in Preparation Example 2 was used, and the input amount of 1-hexene was decreased from 0.3 kg/hr to 0.24 kg/hr.

Comparative Example 11

An ethylene/1-hexene copolymer and a pellet-type polyethylene resin composition (a mean diameter of pellet: 4 mm) were prepared in the same manner as in Example 1, except that the hybrid supported catalyst prepared in Comparative Preparation Example 7 was used.

Experimental Example: Evaluation of Physical Properties of Pellet-Type Polyethylene Resin Composition Physical properties of the pellet-type polyethylene resin compositions prepared in Examples and Comparative Examples were evaluated by the following methods. The results are shown in Tables 1 and 2, and FIGS. 1 to 15 below. However, Comparative Example 5 was not subjected to peak deconvolution, because it did not have a bimodal structure.

(1) Bimodality Index (BMI)

GPC analysis was performed for the pellet-type polyethylene resin compositions prepared in Examples and Comparative Examples in the same manner as in the measurement of '(4) PDI' below, and the results were used to calculate BMI. In detail, gel permeation chromatography (GPC) was performed using a Waters PL-GPC220 instrument equipped with a Polymer Laboratories PLgel MIX-B 300 mm-length column under conditions of a measuring temperature of 160° C. and a flow rate of 1 mL/min using 1,2,4-trichlorobenzene as a solvent. At this time, samples of the pellet-type polyethylene resin compositions were prepared at a concentration of 10 mg/10 mL, and then 200 μL thereof was fed. From the resulting molecular weight distribution curve, BMI was calculated according to the following Equation 1:

$$\text{Bimodality index}=[(\log Mw \text{ difference between bimodal peak } A \text{ and bimodal peak } B)/(FWHM_A\times FA+FWHM_B\times FB)] \quad \text{[Equation 1]}$$

(in Equation 1, the log Mw difference between bimodal peak A and bimodal peak B represents a distance between the two peaks, which is a value obtained by subtracting a maximum intensity value of the bimodal peak A, which is a low molecular weight fraction, from a maximum intensity value of the bimodal peak B, which is a high molecular weight fraction, after separating the low molecular weight fraction and the high molecular weight fraction through peak deconvolution of the molecular weight distribution curve using a Gaussian probability function during gel permeation chromatography analysis of the polyethylene resin composition specimen, $FWHM_A$ and $FWHM_B$ represent full width half maximum values of the bimodal peak A and the bimodal peak B, respectively, and FA and FB represent area ratios obtained by integrating the bimodal peak A and the bimodal peak B, respectively)

(2) Density (g/cm$^3$): Density was measured in accordance with ASTM D 1505.

(3) Melt index ($MI_5$, 5 kg): Melt index was measured in accordance with ISO 1133-1 at 190° C. under a load of 5.0 kg, and expressed as a weight (g) of a polymer molten for 10 minutes.

(4) PDI. Mw and Mn were measured using gel permeation chromatography (GPC), which were used to calculate PDI (Mw/Mn).

In detail, a Waters PL-GPC220 instrument equipped with a Polymer Laboratories PLgel MIX-B 300 mm-length column was used. A measuring temperature was 160° C., 1,2,4-trichlorobenzene was used as a solvent, and a flow rate was 1 mL/min. Samples of the pellet-type polyethylene resin compositions were prepared at a concentration of 10 mg/10 mL, and then 200 μL thereof was fed. The values of Mw and Mn were derived from a calibration curve created using polystyrene standards. 9 kinds of polystyrene standards were used, of which molecular weights (g/mol) were 2,000/10,000/30,000/70,000/200,000/700,000/2,000,000/4,000,000/10,000,000.

(5) MFRR (MI21.6/MI2.16)

$MI_{2.16}$ (190° C., under a load of 2.16 kg) and $MI_{21.6}$ (190° C., under a load of 21.6 kg) of the pellet-type polyethylene resin compositions were measured in accordance with ASTM D1238, respectively, and a melt flow rate ratio (MFRR) was calculated by dividing the value of $MI_{21.6}$ by the value of $MI_{2.16}$. MFRR is commonly used as a value indicating the effect of shear thinning.

(6) $F_{log\ Mw<5.0}$(%)

$F_{log\ Mw<5.0}$ was expressed as a ratio of, to the total area, the integral area of log $M_w$<5.0 fraction from the molecular weight distribution curve (GPC curve) obtained during the PDI measurement (4).

(7) Shear rate$_{onset\ of\ M.F}$ ($MF_{on\_set}$)(l/s)

Shear rate$_{on_set\ of\ M.F}$ indicates a shear rate (l/s) at the onset of melt fracture. The shear viscosity (Pa·s) during strand extrusion was measured in accordance with ASTM D3835 using a capillary rheometer while varying the shear rate for the pellet-type polyethylene resin composition.

As a result, shear viscosity versus shear rate plots were obtained. In the shear rate/shear viscosity curve, the point where instability of the shear viscosity increases and the slope abruptly changes is defined as the onset of melt fracture. The shear rate at this time was regarded as shear $rate_{onset\ of\ M.F.}$ In detail, the surface of the extruded strand was visually observed while changing the shear rate to 102.0 l/s, 102.2 l/s, 1024 l/s, 102.6 l/s, 102.8 l/s, 102.9 l/s, 10295 l/s, and 102.30 l/s using a capillary rheometer (Rheo-tester 2000, manufactured by GΦTTFERT). The shear viscosity, at the starting point where the non-uniformity of the strand surface occurred, was measured. At this time, the shape of orifice was a round hole type, the hole length was 10 mm, the diameter was 2 mm, the run in angle was 180°, and the measuring temperature was 210° C.

(8) Processing area viscosity (η at 25/s) (Pa·S)

Processing area viscosity was measured in accordance with 25/s ISO 3219 under conditions of 190° C. and 25/s using an ARES-G2 rheometer manufactured by TA Instruments, which is a rotary rheometer.

(9) Extensional viscosity (Pa·S)

An ARES-G2 rheometer manufactured by TA Instruments, which is a rotary rheometer, was used. Measurement was performed using an extensional viscosity fixture at a temperature of 190° C., and an extension rate was fixed at 0.1/s. At this time, the pellet-type polyethylene resin composition was measured after being prepared into a specimen with a length of 20 mm, a width of 10 mm, and a thickness of about 0.5 mm.

(10) Yield stress ($\sigma_{yield}$, kg/cm$^2$)

Yield stress was measured using Electromechanical 3382A which is an Instron's model. In detail, the pellet-type polyethylene resin compositions of Examples and Comparative Examples were prepared into ASTM D638 type 4 specimens, and yield stress was measured at 23° C. and a rate of 50 mm/min in accordance with ISO 527.

(11) C.S (MPa)

C.S was measured using Electromechanical 3382A which is an Instron's model. In detail, the pellet-type polyethylene resin compositions of Examples and Comparative Examples were prepared into ASTM D638 Type A specimens, and stress-strain curves according to the draw rates were obtained by drawing at a draw rate of 0.005 mm/mm/s, 0.01 mm/mm/s, 0.05 mm/mm/s, and 0.1 mm/mm/s. With respect to each draw rate, the stress at the maximum point of the stress was determined as the yield stress, and the stress at 100% of the strain was determined as the drawing stress. Using the obtained yield stress and drawing stress with respect to each draw rate, the slope of the yield stress for each draw rate and the slope of the drawing stress for each draw rate were expressed as a linear function, respectively, and the stress corresponding to the intersection of the two linear functions was defined as characteristic stress (C.S).

(12) Strain Hardening Modulus (<Gp>)

Strain hardening modulus is a physical property index indicating a water pressure resistance property. With respect to each of the pellet-type polyethylene resin compositions prepared in Examples and Comparative Examples, a stress/strain curve was obtained under conditions of 80° C. and 20 mm/min in accordance with ISO 18488, and a Neo-Hookean constitutive model curve (x axis:

$$\lambda^2 - \frac{1}{\lambda},$$

y axis: $\sigma_{true}$, wherein λ represents a draw ratio, and $\sigma_{true}$ represents a true stress) was obtained therefrom, and the slope was obtained by linear fitting a true strain of 8 to 12 in the Hookean constitutive model curve, which was expressed as strain hardening modulus(<Gp>).

TABLE 1

| | Bimodality index | Log Mw of bimodal peak A | Log Mw of bimodal peak B | $FWHM_A$ | $FWHM_B$ | FA | FB |
|---|---|---|---|---|---|---|---|
| Comparative Example 1 | 1.03 | 4.37 | 5.43 | 1.06 | 0.99 | 0.48 | 0.52 |
| Comparative Example 2 | 1.00 | 4.30 | 5.34 | 1.06 | 0.99 | 0.50 | 0.50 |
| Comparative Example 3 | 0.78 | 4.43 | 5.31 | 1.38 | 0.95 | 0.40 | 0.60 |
| Comparative Example 4 | 0.99 | 4.29 | 5.30 | 0.99 | 1.02 | 0.44 | 0.56 |
| Comparative Example 5 | — | — | — | — | — | — | — |
| Comparative Example 6 | 1.33 | 4.32 | 5.55 | 1.01 | 0.78 | 0.58 | 0.42 |
| Comparative Example 7 | 0.88 | 4.44 | 5.32 | 1.04 | 0.95 | 0.44 | 0.56 |
| Comparative Example 8 | 1.26 | 4.27 | 5.49 | 0.95 | 1.24 | 0.52 | 0.48 |
| Comparative Example 9 | 1.07 | 4.39 | 5.43 | 0.93 | 1.045 | 0.55 | 0.45 |
| Comparative Example 10 | 1.06 | 4.39 | 5.45 | 0.98 | 1.057 | 0.60 | 0.40 |
| Comparative Example 11 | 1.15 | 4.36 | 5.52 | 0.96 | 1.09 | 0.66 | 0.34 |
| Example 1 | 1.14 | 4.48 | 5.58 | 1.01 | 0.84 | 0.67 | 0.33 |
| Example 2 | 1.02 | 4.40 | 5.46 | 1.04 | 0.97 | 0.59 | 0.41 |
| Example 3 | 1.08 | 4.43 | 5.50 | 0.96 | 1.05 | 0.62 | 0.38 |
| Example 4 | 1.01 | 4.37 | 5.375 | 1.00 | 1.02 | 0.58 | 0.42 |

TABLE 2

| | $MI_5$ (g/10 min) | Density ($g/cm^3$) | Bimodality index | PDI | MFRR | $F_{logMw<5.0}$ (%) | Shear $rate_{onset\ of\ M.F}$ (1/s) | η at 25/s (Pa · S) | Extensional viscosity (Pa · S) | $\sigma_{yield}$ ($kg/cm^2$) | C.S (MPa) | <Gp> (MPa) |
|---|---|---|---|---|---|---|---|---|---|---|---|---|
| Comparative Example 1 | 0.398 | 0.9484 | 1.03 | 13.3 | 59.77 | 54.51 | 100 | 7109.56 | 404,600 | 254.8 | 14.03 | 24.1 |
| Comparative Example 2 | 0.781 | 0.9475 | 1.00 | 15.2 | 54.40 | 59.42 | 251.19 | 5506.98 | 193,404 | 245.5 | 13.02 | 23.0 |
| Comparative Example 3 | 0.601 | 0.9477 | 0.78 | 15.4 | 28.60 | 50.15 | 15.85 | 7873.43 | 280,308 | 238.2 | 12.81 | 22.6 |
| Comparative Example 4 | 0.492 | 0.9473 | 0.99 | 11.2 | 66.04 | 55.78 | 251.19 | 6300.75 | 413,106 | 256.2 | 16.85 | 22.3 |
| Comparative Example 5 | 2.140 | 0.9402 | — | 4.1 | 33.13 | 62.06 | >1000 | 4200 | 59,227 | 214.4 | 12.13 | 23.3 |
| Comparative Example 6 | 0.524 | 0.9410 | 1.33 | 9 | 92.174 | 57.98 | 398.11 | 5640 | 346,747 | — | 11.77 | 23.8 |
| Comparative Example 7 | 0.463 | 0.9444 | 0.88 | 9.6 | 64.6 | 53.44 | 251.19 | 6688 | 378,855 | 236.6 | 14.21 | 24.2 |
| Comparative Example 8 | 0.493 | 0.9462 | 1.26 | 9.5 | 89.65 | 52.30 | 251.19 | 5856 | 335,386 | 236.8 | 12.55 | 22.9 |
| Comparative Example 9 | 0.575 | 0.947 | 1.07 | 12.0 | 72.287 | 60.00 | 630.96 | 5648 | 273,960 | 247.6 | 11.18 | 23.3 |
| Comparative Example 10 | 0.501 | 0.951 | 1.06 | 11.9 | 92.017 | 60.29 | >1000 | 4965 | 300,139 | 295.7 | 11.89 | 21.0 |
| Comparative Example 11 | 0.491 | 0.946 | 1.15 | 14.44 | 100.01 | 66.01 | 251.19 | 6288 | 332,080 | 237.6 | 12.84 | 22.2 |
| Example 1 | 0.484 | 0.9456 | 1.14 | 10.0 | 117.82 | 62.53 | >1000 | 5509.52 | 348,905 | 244.0 | 12.21 | 24.5 |
| Example 2 | 0.480 | 0.9477 | 1.02 | 14.6 | 100.00 | 58.63 | >1000 | 5276.67 | 316,049 | 252.9 | 12.67 | 23.5 |
| Example 3 | 0.537 | 0.9457 | 1.08 | 11.06 | 104.939 | 63.40 | >1000 | 4958.4 | 302,321 | 245.6 | 12.23 | 23.2 |
| Example 4 | 0.739 | 0.9459 | 1.01 | 14.20 | 103.132 | 63.72 | >1000 | 5323.3 | 300,159 | 263.08 | 13.88 | 23.6 |

In Tables 1 and 2, "—" means not measured.

As experimental results, it was confirmed that the pellet-type polyethylene resin compositions of Examples 1 to 4 satisfied the optimal combination of physical properties, thereby exhibiting excellent water pressure resistance property, dimensional stability, and processability.

In contrast, Comparative Example 1, in which the mixing molar ratio of the first and second transition metal compounds did not satisfy the mixing molar ratio of the present invention during preparation of the ethylene/1-hexene copolymer, exhibited MI of 0.4 g/10 min or less, the high processing area viscosity (η at 25/s) due to $F_{log\ Mw}$<5.0 of less than 58%, and the low shear $rate_{onset\ of\ M.F}$ of 100/s, thereby exhibiting a deterioration in processability. Further, Comparative Example 2, in which the same hybrid supported catalyst as in Comparative Example 1 was used, but the input amount of hydrogen was increased during the polymerization process, exhibited the excessively broad PDI and low MFRR, and the low shear $rate_{onset\ of\ M.F}$, thereby exhibiting a deterioration in processability, and also exhibited the low extensional viscosity, thereby exhibiting a deterioration in dimensional stability.

Further, Comparative Example 3, in which the structures of the first and second transition metal compounds did not satisfy the structural conditions of the present invention during preparation of the ethylene/1-hexene copolymer, exhibited the significantly low bimodality index of 0.78, the high processing area viscosity due to $F_{log\ Mw<5.0}$ of less than 58%, and the low shear $rate_{onset\ of\ M.F}$, thereby exhibiting a deterioration in processability. In addition, Comparative Example 3 exhibited a deterioration in dimensional stability due to the low extensional viscosity, and also exhibited a deterioration in water pressure resistance property due to the low yield stress.

In addition, Comparative Example 4, in which the second transition metal compound was used in an excessively large amount, as compared to the first transition metal compound, in the hybrid supported catalyst during preparation of the ethylene/1-hexene copolymer, exhibited the optimal range of MI, excellent dimensional stability due to the increased extensional viscosity, but exhibited the high processing area viscosity due to $F_{log\ Mw<5.0}$ of less than 58%, and also exhibited the low shear $rate_{onset\ of\ M.F}$, thereby exhibiting a deterioration in processability.

Further, Comparative Example 5, in which the structure of the second transition metal compound did not satisfy the structural conditions of the present invention during preparation of the ethylene/1-hexene copolymer, exhibited $F_{log\ Mw<5.0}$ of 62.06%, the low processing area viscosity, and the high shear $rate_{onset\ of\ M.F}$, thereby exhibiting excellent processability, but did not exhibit the bimodal structure, exhibited excessively narrow PDI and excessively high MI, and the low density of less than 0.945 $g/cm_3$, and the low extensional viscosity, thereby exhibiting a deterioration in dimensional stability, and also exhibited the low yield stress, thereby exhibiting a deterioration in the water pressure resistance property.

Comparative Example 6 including the commercially available ethylene/1-hexene copolymer XP9020® (produced by DAELIM) prepared by using the existing metallocene catalyst exhibited the excessively high bimodality index, the low density, and $F_{log\ Mw<5.0}$ of 58% or less. Comparative Example 6 also exhibited the low shear $rate_{onset\ of\ M.F}$ and the faster onset of melt fracture, and also exhibited the increased occurrence of melt fracture, thereby exhibiting a great deterioration in processability.

Further, Comparative Example 7, in which the structure of the second transition metal compound did not satisfy the structural conditions of the present invention, and it was used in the excessively large amount, as compared with the first transition metal compound, during preparation of the ethylene/1-hexene copolymer, exhibited the low bimodality index of 0.88, the excessively narrow molecular weight distribution, and the high processing area viscosity due to $F_{log\ Mw<5.0}$ of less than 58%. As a result, the processability was deteriorated. In addition, Comparative Example 7 exhibited the low yield stress, thereby also exhibiting a deterioration in the water pressure resistance property.

Further, Comparative Example 8, in which the structure of the second transition metal compound did not satisfy the structural conditions of the present invention during preparation of the ethylene/1-hexene copolymer, exhibited the excessively high bimodality index, the narrow molecular weight distribution, $F_{log\ Mw<5.0}$ of less than 58%, and the low shear $rate_{onset\ of\ M.F}$, and the faster onset of melt fracture, and increased occurrence of melt fracture, thereby exhibiting a deterioration in processability. Comparative Example 8 exhibited the low yield stress, thereby also exhibiting a deterioration in the water pressure resistance property.

Meanwhile, the powder-type polyethylene resin composition of Comparative Example 9, in which the input conditions of the catalyst and hydrogen were satisfied during preparation of the ethylene/1-hexene copolymer, but the extrusion process of preparing the pellet-type resin composition was not performed, exhibited the low shear $rate_{onset\ of\ M.F}$ and the faster onset of melt fracture, and the increased occurrence of melt fracture, thereby exhibiting a deterioration in processability, and also exhibited the low extensional viscosity, thereby exhibiting a deterioration in dimensional stability.

Further, Comparative Example 10, in which the input amount of 1-hexene was excessively low, as compared with the ethylene monomer during preparation of the ethylene/1-hexene copolymer, exhibited the excessively high density and the low <GP> of 21.0 MPa, thereby exhibiting a great deterioration in the water pressure resistance property.

Comparative Example 11, in which the structural conditions of the first and second transition metal compounds were satisfied, but the mixing ratio thereof was not satisfied during preparation of the ethylene/1-hexene copolymer, exhibited $F_{log\ Mw<5.0}$ of more than 65%, the low yield stress, thereby exhibiting a deterioration in dimensional stability and water pressure resistance property, and also exhibited the high processing area viscosity and the low shear $rate_{onset\ of\ M.F}$, thereby exhibiting a deterioration in processability.

The invention claimed is:

1. A pellet-form polyethylene resin composition comprising an ethylene/1-hexene copolymer and satisfying the following conditions of (a1) to (a5), and (b3) and (b4):

(a1) melt index measured at 190° C. under a load of 5.0 kg in accordance with ISO 1133-1 is 0.40 g/10 min to 0.80 g/10 min;

(a2) density measured in accordance with ASTM D 1505 is 0.945 $g/cm^3$ to 0.950 $g/cm^3$, (a3) $F_{log\ Mw<5.0}$ is 58% to 65%, wherein $F_{log\ Mw<5.0}$ represents a value expressed as a ratio of, to a total area, an integral area of log Mw<5.0 fraction from a molecular weight distribution curve in gel permeation chromatography analysis of a pellet-form polyethylene resin composition specimen, wherein Mw represents a weight average molecular weight;

(a4) bimodality index (BMI) according to the following Equation 1 is 0.95 to 1.2:

$$\text{Bimodality index}=[(\log Mw \text{ difference between bimodal peak } A \text{ and bimodal peak } B)/(FWHM_A \times F_A + FWHM_B \times F_B)] \quad \text{[Equation 1]}$$

wherein in Equation 1, the log Mw difference between bimodal peak A and bimodal peak B represents a distance between the two peaks, which is a value obtained by subtracting a maximum intensity value of the bimodal peak A, which is a low molecular weight fraction, from a maximum intensity value of the bimodal peak B, which is a high molecular weight fraction, after separating the low molecular weight fraction and the high molecular weight fraction through peak deconvolution of the molecular weight distribution curve using a Gaussian probability function in gel permeation chromatography analysis of the pellet-form polyethylene resin composition specimen, $FWHM_A$ and $FWHM_B$ represent full width half maximum values of the bimodal peak A and the bimodal peak B, respectively, and FA and FB represent area ratios obtained by integrating the bimodal peak A and the bimodal peak B, respectively), (a5) shear rate at an onset of melt fracture measured in accordance with ASTM D3835 is 800 (1/s) or more, (b3) extensional viscosity measured in accordance with ASTM D4065 is 300,000 Pa·S or more, and (b4) processing area viscosity n at 25/s measured in accordance with ISO 3219 is 5,600 Pa's or less.

2. The pellet-form polyethylene resin composition of claim 1, further satisfying one or more of the following conditions of (b1), (b2), (b5) and to (b6):

(b1) melt flow rate ratio obtained by dividing a melt index value measured at 190° C. under a load of 21.6 kg in accordance with ASTM 1238 by a melt index value measured at 190° C. under a load of 2.16 kg in accordance with ASTM 1238 is 96 or more;

(b2) polydispersity index is 10 to 15;

(b5) yield stress Oyield, measured at 23° C. and a speed of 50 mm/min in accordance with ISO 527 after preparing a specimen according to ASTM D638 type 4 standards is 240 $kg/cm^2$ or more;

(b6) strain hardening modulus is 22.0 MPa to 25 MPa, wherein the strain hardening modulus is a slope obtained by linear fitting a true strain of 8 to 12 in a Neo-Hookean constitutive model curve, the Neo-Hookean constitutive model curve is obtained from a stress/strain curve under conditions of 80° C. and 20 mm/min in accordance with ISO 18488, and in the Neo-Hookean constitutive model curve, x axis is $$\lambda^2 - \frac{1}{\lambda},$$

and y axis is $\sigma_{true}$, wherein $\lambda$ represents a draw ratio, and $\sigma_{true}$ represents a true stress.

3. The pellet-form polyethylene resin composition of claim 1, further comprising an antioxidant in an amount of 0.01% by weight to 1% by weight with respect to a total weight of the polyethylene resin composition.

4. The pellet-form polyethylene resin composition of claim 3, wherein the antioxidant comprises an organometallic antioxidant and a phenolic antioxidant at a weight ratio of 1:1 to 1:2.

5. A method of preparing the pellet-form polyethylene resin composition of claim 1, comprising:

preparing an ethylene/1-hexene copolymer by performing a polymerization reaction of an ethylene monomer and a 1-hexene comonomer in the presence of a hybrid supported catalyst; and preparing a resin composition comprising the ethylene/1-hexene copolymer, and then extruding the resin composition in a form of pellets, wherein the extrusion is performed at a pellet die temperature of 150° C. to 170° C., wherein the extrusion is performed at a pellet die pressure of 20 bar to 50 bar, wherein the hybrid supported catalyst comprises a first transition metal compound comprising one or more of a compound represented by the following Chemical Formula 1 and a compound represented by the following Chemical Formula 2; a second transition metal compound represented by the following Chemical Formula 3; and a carrier;

the first transition metal compound and the second transition metal compound are comprised at a molar ratio of 1:0.5 to 1:1.4, the 1-hexene comonomer is introduced in an amount of 0.75 parts by weight to 10 parts by weight with respect to 100 parts by weight of the ethylene monomer:

$(Cp^1R^a)_n(Cp^2R^b)M^1Z^1_{3-n}$ [Chemical Formula 1]

wherein in Chemical Formula 1, $M^1$ is a Group 4 transition metal;

$Cp^1$ and $Cp^2$ are the same as or different from each other, and each independently cyclopentadienyl substituted or unsubstituted with a $C_{1-20}$ hydrocarbyl group;

$R^a$ and $R^b$ are the same as or different from each other, and each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ is halogen, $C_{1-20}$ alkyl, $C_{2-20}$ alkenyl, $C_{7-40}$ alkylaryl, $C_{7-40}$ arylalkyl, $C_{6-20}$ aryl, a substituted or unsubstituted amino group, $C_{2-20}$ alkoxyalkyl, $C_{2-20}$ alkylalkoxy, or $C_{7-40}$ arylalkoxy;

n is 1 or 0;

[Chemical Formula 2]

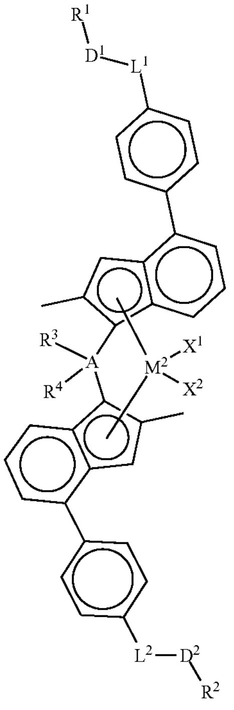

wherein in Chemical Formula 2, $M^2$ is Group 4 transition metal;

A is carbon, silicon, or germanium;

$X^1$ and $X^2$ are the same as or different from each other, and each independently halogen or $C_{1-20}$ alkyl;

$L^1$ and $L^2$ are the same as or different from each other, and each independently $C_{1-20}$ alkylene;

$D^1$ and $D^2$ are oxygen;

$R^1$ and $R^2$ are the same as or different from each other, and each independently $C_{1-20}$ alkyl, $C_{2-20}$ alkenyl, $C_{6-20}$ aryl, $C_{7-40}$ alkylaryl, or $C_{7-40}$ arylalkyl;

$R^3$ and $R^4$ are the same as or different from each other, and each independently $C_{1-20}$ alkyl;

[Chemical Formula 3]

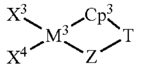

wherein in Chemical Formula 3, $Cp^3$ is any one of ligands represented by the following Chemical Formulae 4a to 4d,

[Chemical Formula 4a]

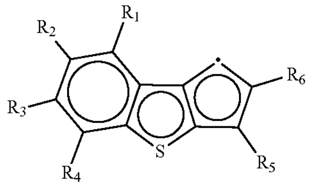

[Chemical Formula 4b]

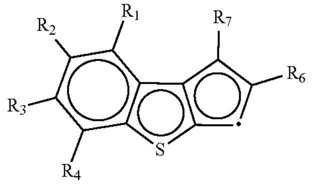

[Chemical Formula 4c]

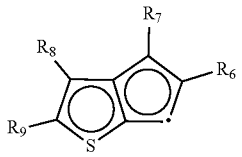

[Chemical Formula 4d]

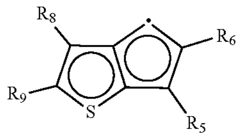

wherein in Chemical Formulae 4a to 4d, $R_1$ to $R_9$ are the same as or different from each other, and each independently hydrogen, a $C_{1-30}$ hydrocarbyl group, or a $C_{1-30}$ hydrocarbyloxy group;

Z is —O—, —S—, —$NR_{10}$—, or —$PR_{11}$—;

$R_{10}$ and $R_{11}$ are each independently hydrogen, a $C_{1-20}$ hydrocarbyl group, a $C_{1-20}$ hydrocarbyl(oxy) silyl group, or a $C_{1-20}$ silylhydrocarbyl group;

$M^3$ is Ti, Zr, or Hf;

$X^3$ and $X^4$ are the same as or different from each other, and each independently halogen, a nitro group, an amido group, a phosphine group, a phosphide group, a $C_{1-30}$ hydrocarbyl group, a $C_{1-30}$ hydrocarbyloxy group, a $C_{2-30}$ hydrocarbyloxyhydrocarbyl group, —$SiH_3$, a $C_{1-30}$ hydrocarbyl(oxy) silyl group, a $C_{1-30}$ sulfonate group, or $C_{1-30}$ sulfone group;

T is

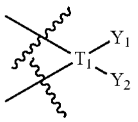

or

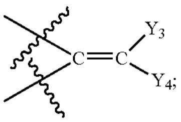

$T_1$ is C, Si, Ge, Sn, or Pb;

$Y_1$ and $Y_3$ are each independently hydrogen, a $C_{1-30}$ hydrocarbyl group, a $C_{1-30}$ hydrocarbyloxy group, a $C_{2-30}$ hydrocarbyloxyhydrocarbyl group, —$SiH_3$, a $C_{1-30}$ hydrocarbyl(oxy) silyl group, a halogen-substituted $C_{1-30}$ hydrocarbyl group, or —$NR_{12}R_{13}$;

$Y_2$ and $Y_4$ are each independently a $C_{2-30}$ hydrocarbyloxyhydrocarbyl group; and $R_{12}$ and $R_{13}$ are the same as or different from each other, and each independently any one of hydrogen or $C_{1-30}$ hydrocarbyl group, or connected with each other to form an aliphatic or aromatic ring.

6. The method of claim 5, wherein $M^1$ is Zr or Hf, $Cp^1$ and $Cp^2$ are each independently cyclopentadienyl substituted or unsubstituted with one or more $C_{1-20}$ alkyls, $R^a$ and $R^b$ are each hydrogen, $C_{1-6}$ linear or branched alkyl, $C_{1-6}$ alkyl substituted with $C_{1-6}$ alkoxy, $C_{1-6}$ alkyl substituted with $C_{6-12}$ aryl, or $C_{6-12}$ aryl, and $Z^1$ is each halogen.

7. The method of claim 5, wherein the first transition metal compound comprises a compound represented by any one of the following structural formulae:

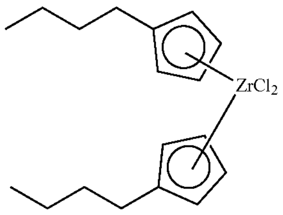

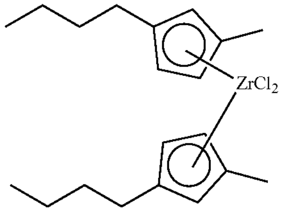

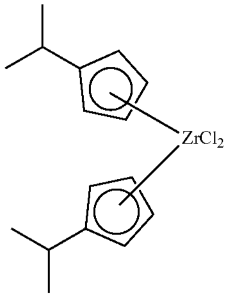

-continued

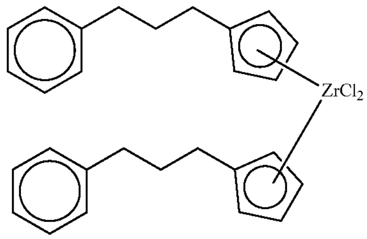

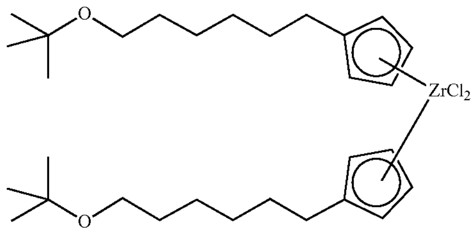

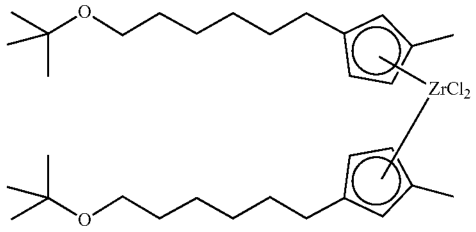

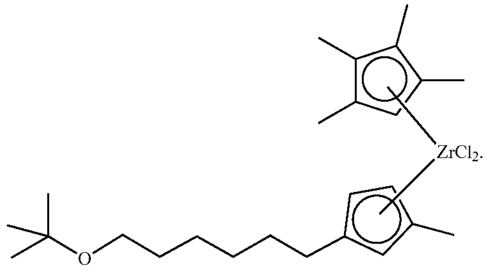

8. The method of claim 5, wherein $M^2$ is Zr or Hf,

A is Si, $X^1$ and $X^2$ are each independently halogen, $L^1$ and $L^2$ are each independently $C_{1-6}$ alkylene, $R^1$ and $R^2$ are each independently $C_{1-6}$ linear or branched alkyl, or $C_{6-12}$ aryl, and $R^3$ and $R^4$ are each independently $C_{1-6}$ linear or branched alkyl.

9. The method of claim 5, wherein the compound represented by Chemical Formula 2 is represented by any one of the following structural formulae:

-continued
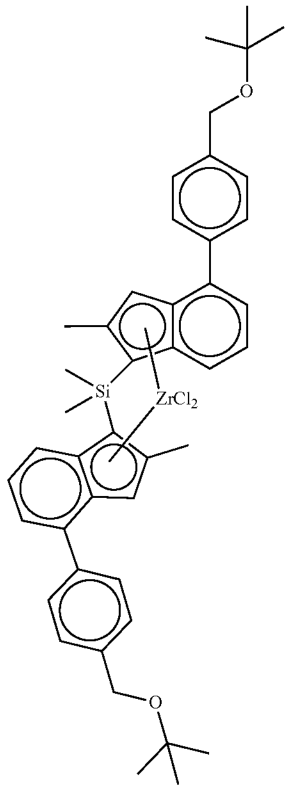
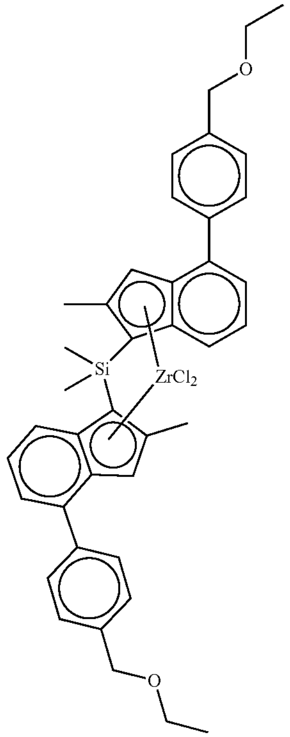
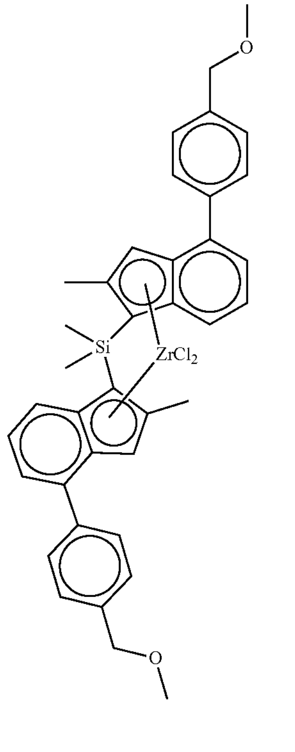
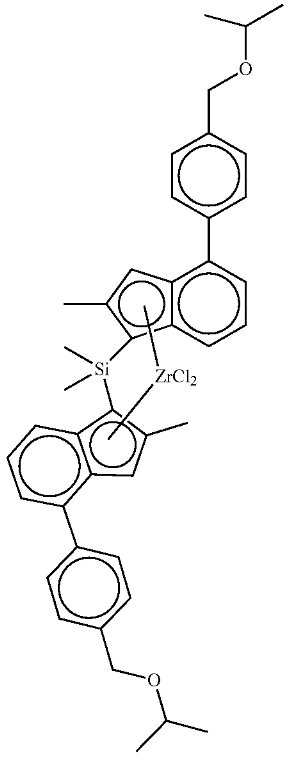

-continued
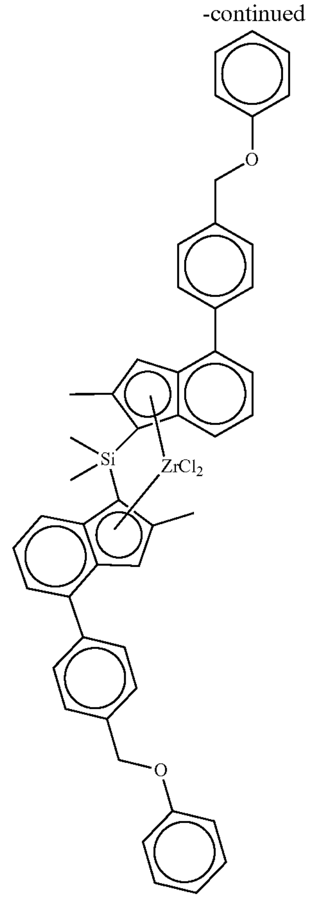
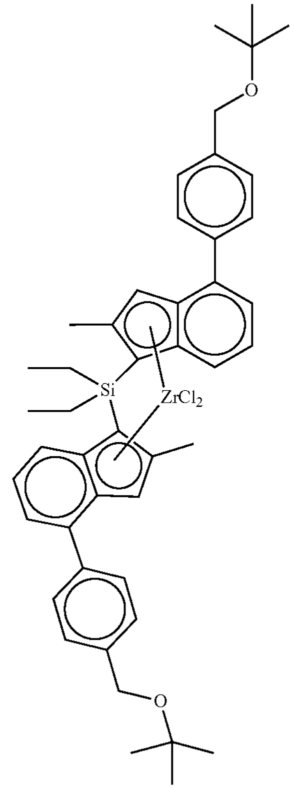
-continued
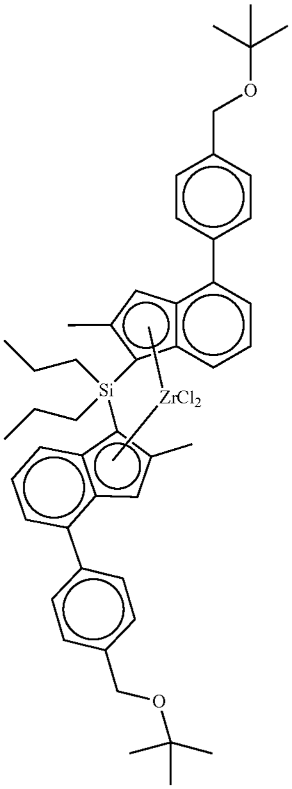
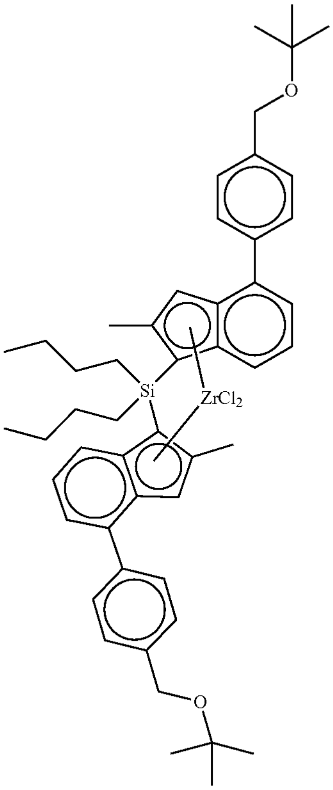

-continued

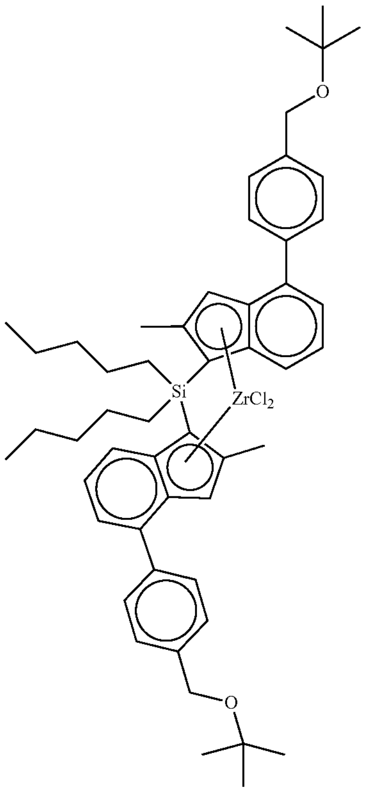

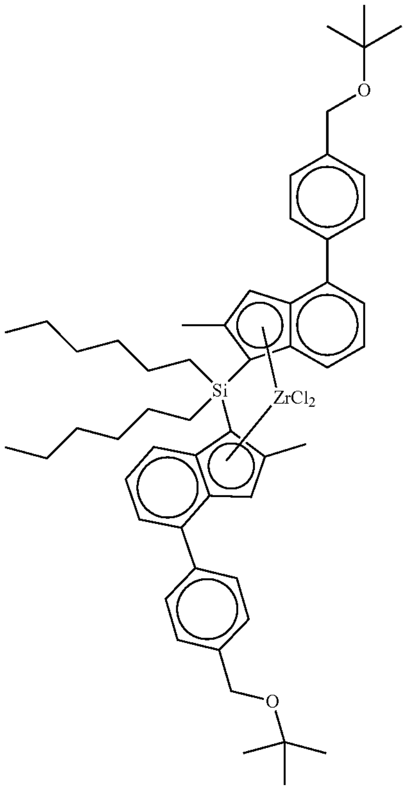

10. The method of claim 5, wherein the compound represented by Chemical Formula 3 is any one of compounds represented by the following Chemical Formulae 5 to 8:

[Chemistry Formula 5]

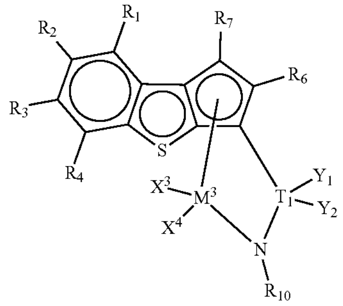

[Chemistry Formula 6]

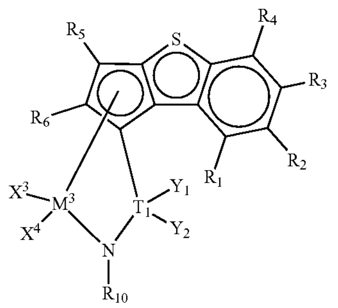

[Chemistry Formula 7]

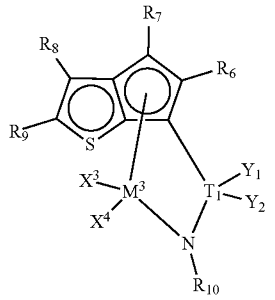

[Chemistry Formula 8]

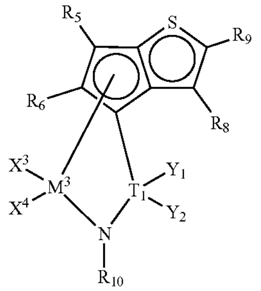

wherein in Chemical Formulae 5 to 8, $R_1$ to $R_4$, $R_8$ and $R_9$ are the same as or different from each other, and each independently hydrogen or a $C_{1-10}$ hydrocarbyl group, $R_5$ to $R_7$ are the same as or different from each other, and each independently a $C_{1-10}$ hydrocarbyl group, $R_{10}$ is a $C_{1-10}$ hydrocarbyl group, $M^3$ is Ti, Zr, or Hf, $X^3$ and $X^4$ are the same as or different from each other, and each independently halogen, $T_1$ is C or Si, $Y_1$ is a $C_{1-30}$ hydrocarbyl group or a $C_{1-30}$ hydrocarbyloxy group, and $Y_2$ is a $C_{2-30}$ hydrocarbyloxyhydrocarbyl group.

11. The method of claim 5, wherein the second transition metal compound comprises a compound represented by any one of the following structural formulae:

-continued

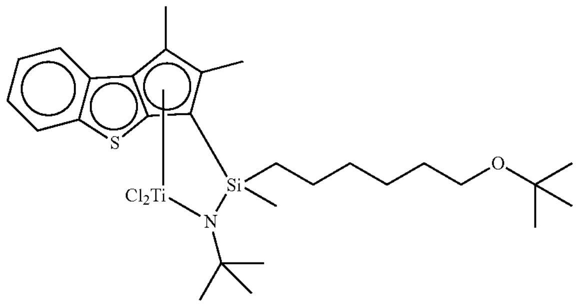

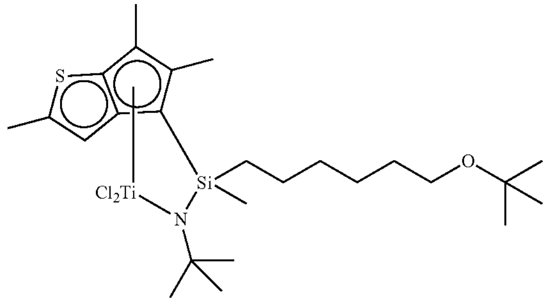

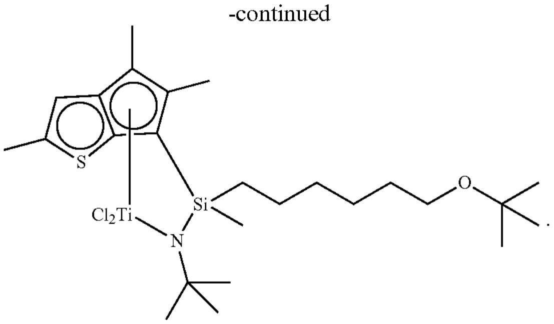

12. The method of claim 5, wherein hydrogen gas is introduced in an amount of 120 ppm to 2500 ppm with respect to a total weight of the ethylene monomer and the 1-hexene comonomer during the polymerization reaction.

13. The method of claim 5, wherein an antioxidant is further introduced in an amount of 0.01% by weight to 1% by weight with respect to the total weight of the resin composition during preparation of the resin composition including the ethylene/1-hexene copolymer.

14. A pipe manufactured by using the pellet-form polyethylene resin composition of claim 1.

* * * * *